United States Patent
Freedman et al.

(10) Patent No.: US 9,848,370 B1
(45) Date of Patent: Dec. 19, 2017

(54) SATELLITE BEAMFORMING

(71) Applicant: RKF Engineering Solutions LLC, Washington, DC (US)

(72) Inventors: Jeffrey Freedman, Laurel, MD (US); Scott Conrad Markley, Washington, DC (US); Erik Halvorson, Vienna, VA (US); Arnold Berman, Washington, DC (US)

(73) Assignee: RKF Engineering Solutions LLC, Washington, DC (US)

( * ) Notice: Subject to any disclaimer, the term of this patent is extended or adjusted under 35 U.S.C. 154(b) by 299 days.

(21) Appl. No.: 15/070,362

(22) Filed: Mar. 15, 2016

Related U.S. Application Data

(60) Provisional application No. 62/133,619, filed on Mar. 16, 2015.

(51) Int. Cl.
| | |
|---|---|
| *H04W 40/02* | (2009.01) |
| *H04B 17/10* | (2015.01) |
| *H04W 84/06* | (2009.01) |

(52) U.S. Cl.
CPC .......... *H04W 40/02* (2013.01); *H04B 17/102* (2015.01); *H04W 84/06* (2013.01)

(58) Field of Classification Search
CPC ..... H04W 40/02; H04W 84/06; H04B 17/102
USPC ........................................................ 455/12.1
See application file for complete search history.

(56) References Cited

U.S. PATENT DOCUMENTS

| | | | | |
|---|---|---|---|---|
| 4,689,625 A * | 8/1987 | Barmat | ................ | H04B 7/2041 342/353 |
| 4,901,310 A * | 2/1990 | Ichiyoshi | ............. | H04B 7/2045 370/307 |
| 4,907,004 A * | 3/1990 | Zacharatos | .............. | H01Q 3/40 342/354 |
| 4,929,956 A * | 5/1990 | Lee | ....................... | H01Q 3/2676 342/376 |
| 4,931,802 A * | 6/1990 | Assal | .................... | H04B 7/2046 342/356 |
| 4,965,605 A * | 10/1990 | Chang | ...................... | H01Q 3/24 343/700 MS |
| 5,119,042 A * | 6/1992 | Crampton | ............. | H03F 1/0216 330/136 |
| 5,220,320 A * | 6/1993 | Assal | .................... | H04B 7/2046 340/2.21 |
| 5,289,193 A * | 2/1994 | Lenormand | .......... | H01Q 25/007 342/373 |
| 5,604,462 A * | 2/1997 | Gans | ........................ | H03F 1/32 330/124 D |
| 5,625,624 A * | 4/1997 | Rosen | ................ | H04B 7/18523 370/307 |

(Continued)

*Primary Examiner* — Hai V Nguyen
(74) *Attorney, Agent, or Firm* — Fish & Richardson P.C.

(57) ABSTRACT

A beam former processor receives a group of signals for transmission through the plurality of amplifiers, wherein the group of signals is less than a total number of feeds in an antenna array. The beam former processor determines terrestrial regions for transmitting the group of signals. The beam former processor identifies a subset of feeds that are configured to form beams covering the terrestrial regions. The beam former processor controls the switching circuitry to route the group of signals from the plurality of amplifiers to the subset of feeds through the switching circuitry, such that the subset of feeds are enabled to form beams that cover the terrestrial regions based on the group of signals.

34 Claims, 14 Drawing Sheets

(56) References Cited

U.S. PATENT DOCUMENTS

| | | | | |
|---|---|---|---|---|
| 5,642,122 A * | 6/1997 | Lockie | B64G 1/22 | 343/881 |
| 5,689,272 A * | 11/1997 | Harrison | H01Q 3/22 | 342/372 |
| 5,734,349 A * | 3/1998 | Lenormand | H01Q 25/007 | 342/371 |
| 5,754,942 A * | 5/1998 | Wachs | G01R 19/25 | 455/13.4 |
| 5,784,030 A * | 7/1998 | Lane | H01Q 3/267 | 342/174 |
| 5,818,388 A * | 10/1998 | Lane | H04B 7/2041 | 342/373 |
| 5,822,312 A * | 10/1998 | Peach | H04B 7/2041 | 370/323 |
| 5,825,762 A * | 10/1998 | Kamin, Jr. | H01Q 3/22 | 342/373 |
| 5,861,844 A * | 1/1999 | Gilmore | H04B 1/74 | 342/374 |
| 5,889,494 A * | 3/1999 | Reudink | H01Q 1/246 | 342/373 |
| 5,917,371 A * | 6/1999 | Chesarek | H03F 3/602 | 330/124 R |
| 5,929,804 A * | 7/1999 | Jones | H01Q 3/40 | 342/354 |
| 5,929,809 A * | 7/1999 | Erlick | H01Q 3/267 | 342/174 |
| 5,936,591 A * | 8/1999 | Yamasa | H01Q 3/40 | 342/373 |
| 5,936,592 A * | 8/1999 | Ramanujam | H01Q 3/2605 | 342/373 |
| 5,955,917 A * | 9/1999 | Mandell | H03F 1/3247 | 330/129 |
| 5,956,620 A * | 9/1999 | Lazaris-Brunner | H04B 7/18515 | 370/316 |
| 5,966,094 A * | 10/1999 | Ward | H01Q 1/246 | 342/373 |
| 5,991,280 A * | 11/1999 | Ichiyoshi | H04B 7/2125 | 370/321 |
| 5,995,495 A * | 11/1999 | Sampson | H04H 40/90 | 370/316 |
| 6,016,123 A * | 1/2000 | Barton | H01Q 1/246 | 342/373 |
| 6,064,127 A * | 5/2000 | Vaillant | H04Q 11/0005 | 307/113 |
| 6,104,935 A * | 8/2000 | Smith | H01Q 1/246 | 455/561 |
| 6,157,621 A * | 12/2000 | Brown | H01Q 1/242 | 370/310 |
| 6,157,812 A * | 12/2000 | Sarraf | H04B 7/18515 | 370/316 |
| 6,175,719 B1 * | 1/2001 | Sarraf | H04B 7/2041 | 455/13.1 |
| 6,233,433 B1 * | 5/2001 | Norin | H04B 7/18519 | 455/13.3 |
| 6,252,548 B1 * | 6/2001 | Jeon | H01Q 3/26 | 342/383 |
| 6,259,899 B1 * | 7/2001 | Mandell | H04W 52/42 | 330/124 R |
| 6,272,317 B1 * | 8/2001 | Houston | H04B 7/18578 | 342/354 |
| 6,317,100 B1 * | 11/2001 | Elson | H01Q 21/22 | 343/833 |
| 6,336,030 B2 * | 1/2002 | Houston | H04B 7/18578 | 455/12.1 |
| 6,397,082 B1 * | 5/2002 | Searle | H04W 48/12 | 455/434 |
| 6,421,341 B1 * | 7/2002 | Han | H04L 49/101 | 370/360 |
| 6,421,528 B1 * | 7/2002 | Rosen | H04B 7/18513 | 455/13.3 |
| 6,442,148 B1 * | 8/2002 | Adams | H04B 7/2041 | 342/356 |
| 6,445,343 B1 * | 9/2002 | Pietrusiak | H01Q 3/267 | 342/173 |
| 6,496,157 B1 * | 12/2002 | Mottier | H01Q 1/246 | 342/373 |
| 6,522,643 B1 * | 2/2003 | Jacomb-Hood | H04B 7/18539 | 370/330 |
| 6,542,479 B1 * | 4/2003 | Boudier | H04B 7/212 | 370/319 |
| 6,571,081 B1 * | 5/2003 | Reinhardt | H01Q 1/288 | 455/12.1 |
| 6,704,544 B1 * | 3/2004 | Sarraf | H04B 7/2041 | 455/13.1 |
| 6,714,521 B2 * | 3/2004 | Draim | B64G 1/1085 | 370/316 |
| 6,728,554 B1 * | 4/2004 | Wegner | H01Q 1/246 | 342/373 |
| 6,745,006 B2 * | 6/2004 | Shaneyfelt | H04B 7/19 | 455/12.1 |
| 6,747,595 B2 * | 6/2004 | Hirabe | H01Q 3/267 | 342/174 |
| 6,799,014 B2 * | 9/2004 | Rosen | H04B 7/18513 | 455/12.1 |
| 6,859,168 B2 * | 2/2005 | Isaji | G01S 7/4021 | 342/107 |
| 6,859,652 B2 * | 2/2005 | Karabinis | H04B 7/18563 | 455/427 |
| 6,865,388 B2 * | 3/2005 | Walsh | H04B 7/1858 | 370/316 |
| 6,871,049 B2 * | 3/2005 | Sugar | H01Q 3/28 | 455/103 |
| 6,911,938 B1 * | 6/2005 | Das | H01Q 3/40 | 342/354 |
| 6,951,941 B2 * | 10/2005 | Kwiatkowski | H01P 1/12 | 343/772 |
| 6,961,025 B1 * | 11/2005 | Chethik | H01Q 1/288 | 343/705 |
| 7,031,653 B1 * | 4/2006 | Turley | H04B 7/18515 | 370/316 |
| 7,064,710 B1 * | 6/2006 | Ksienski | H01Q 21/0006 | 342/372 |
| 7,072,410 B1 * | 7/2006 | Monsen | H04L 1/0071 | 370/335 |
| 7,088,173 B1 * | 8/2006 | Rozario | H03F 1/02 | 330/124 R |
| 7,088,671 B1 * | 8/2006 | Monsen | H04B 1/7107 | 370/203 |
| 7,099,624 B1 * | 8/2006 | Sherman | H04B 7/216 | 370/325 |
| 7,110,462 B2 * | 9/2006 | Monsen | H04L 1/0041 | 370/329 |
| 7,132,979 B2 * | 11/2006 | Langenberg | H01Q 3/40 | 342/368 |
| 7,142,521 B2 * | 11/2006 | Haugli | H04B 7/216 | 370/320 |
| 7,180,447 B1 * | 2/2007 | Jacomb-Hood | H01Q 3/24 | 342/373 |
| 7,181,163 B2 * | 2/2007 | Coromina | H04B 7/1851 | 370/316 |
| 7,245,881 B2 * | 7/2007 | Sugar | H01Q 3/28 | 455/115.1 |
| 7,256,735 B2 * | 8/2007 | Hoffmann | H03F 3/211 | 342/373 |
| 7,369,085 B1 * | 5/2008 | Jacomb-Hood | H01Q 3/24 | 342/372 |
| 7,463,672 B2 * | 12/2008 | Monsen | H04B 1/7105 | 370/319 |
| 7,474,263 B1 * | 1/2009 | Garfinkle | H01Q 1/28 | 342/372 |
| 7,511,666 B2 * | 3/2009 | Jacomb-Hood | H01Q 1/288 | 342/373 |
| 7,542,716 B2 * | 6/2009 | Bell | H04B 7/18515 | 455/3.02 |
| 7,590,083 B2 * | 9/2009 | Haugli | H04B 7/2041 | 370/320 |

(56) References Cited

U.S. PATENT DOCUMENTS

| | | | | |
|---|---|---|---|---|
| 7,590,204 B2* | 9/2009 | Monsen | H04L 25/03057 | 375/350 |
| 7,599,657 B2* | 10/2009 | Schiff | H04B 7/18513 | 455/12.1 |
| 7,751,372 B2* | 7/2010 | Monsen | H04B 7/0632 | 370/235 |
| 7,762,498 B1* | 7/2010 | Henderson | B64G 1/401 | 244/171.1 |
| 7,769,343 B2* | 8/2010 | Coromina | H01Q 3/267 | 455/13.3 |
| 7,787,819 B2* | 8/2010 | Walker | H04B 7/2041 | 342/174 |
| 7,813,766 B1* | 10/2010 | Lam | H01Q 3/30 | 343/853 |
| 7,925,208 B2* | 4/2011 | Sarraf | H04B 7/2041 | 370/319 |
| 7,979,024 B2* | 7/2011 | Zheng | H04B 7/06 | 455/25 |
| 8,000,213 B2* | 8/2011 | Ichiryu | G11B 7/00745 | 369/124.12 |
| 8,064,920 B2* | 11/2011 | Bell | H04B 7/18515 | 455/452.1 |
| 8,090,041 B2* | 1/2012 | Zheng | H04B 7/06 | 375/267 |
| 8,193,975 B2* | 6/2012 | Zheng | H01Q 3/2605 | 342/354 |
| 8,217,760 B2* | 7/2012 | Wild | G01S 3/14 | 340/10.1 |
| 8,259,005 B1* | 9/2012 | Lam | H01P 1/184 | 342/157 |
| 8,270,899 B2* | 9/2012 | Walker | H04B 7/2041 | 342/174 |
| 8,289,209 B2* | 10/2012 | Corman | H01Q 3/26 | 342/373 |
| 8,331,329 B2* | 12/2012 | Sayegh | H04B 7/18513 | 370/316 |
| 8,339,308 B2* | 12/2012 | Churan | H04B 7/18515 | 342/354 |
| 8,354,956 B2* | 1/2013 | Matyas | H01Q 19/12 | 342/354 |
| 8,358,971 B2* | 1/2013 | Schiff | H04B 7/18515 | 455/11.1 |
| 8,395,546 B2* | 3/2013 | Chang | H01Q 3/2605 | 342/373 |
| 8,412,096 B2* | 4/2013 | Sutskover | H01Q 3/26 | 455/25 |
| 8,451,172 B2* | 5/2013 | Angeletti | H01Q 3/40 | 342/373 |
| 8,494,445 B2* | 7/2013 | Miller | H04B 7/2041 | 342/373 |
| 8,509,144 B2* | 8/2013 | Miller | H04W 88/04 | 370/326 |
| 8,542,629 B2* | 9/2013 | Miller | H04W 24/02 | 370/326 |
| 8,560,018 B2* | 10/2013 | Khan | H04B 7/0491 | 455/443 |
| 8,576,769 B2* | 11/2013 | Zheng | H04B 7/086 | 370/316 |
| 8,626,080 B2* | 1/2014 | Sutskover | H01Q 3/26 | 455/63.4 |
| 8,717,229 B2* | 5/2014 | Blachford | H01Q 1/3233 | 342/109 |
| 8,792,822 B2* | 7/2014 | Wang | H04B 7/18519 | 370/316 |
| 8,805,275 B2* | 8/2014 | O'Neill | H04B 7/18515 | 370/316 |
| 8,862,122 B2* | 10/2014 | Barthere | H04B 7/18508 | 455/12.1 |
| 8,907,845 B2* | 12/2014 | Jones | G01S 7/4004 | 342/368 |
| 8,928,528 B2* | 1/2015 | Harel | H01Q 3/00 | 342/373 |
| 8,929,483 B1* | 1/2015 | Mandell | H03F 1/3294 | 375/297 |
| 9,209,891 B1* | 12/2015 | Mandell | H04B 7/1851 | |
| 9,271,293 B2* | 2/2016 | Sutskover | H01Q 3/26 | |
| 9,287,961 B2* | 3/2016 | Chang | H01Q 3/2605 | |
| 9,293,820 B2* | 3/2016 | Koduru | H01Q 3/40 | |
| 9,337,918 B2* | 5/2016 | Bell | H04B 7/18515 | |
| 9,343,808 B2* | 5/2016 | Harel | H01Q 3/00 | |
| 9,356,685 B2* | 5/2016 | Angeletti | | |
| 9,373,896 B2* | 6/2016 | Runyon | H01Q 3/30 | |
| 9,379,806 B1* | 6/2016 | Mandell | H01Q 3/40 | |
| 9,407,337 B2* | 8/2016 | Jalloul | H04B 7/0413 | |
| 9,531,070 B2* | 12/2016 | Schiller | H01Q 3/42 | |
| 9,548,778 B2* | 1/2017 | Bardy | H04B 1/006 | |
| 9,568,589 B1* | 2/2017 | Mandell | G01S 7/023 | |
| 2002/0067310 A1* | 6/2002 | Pietrusiak | H01Q 3/267 | 342/368 |
| 2002/0068526 A1* | 6/2002 | Butte | H04B 7/18515 | 455/13.1 |
| 2002/0132577 A1* | 9/2002 | Draim | H04B 7/195 | 455/12.1 |
| 2002/0136191 A1* | 9/2002 | Draim | H04B 7/195 | 370/344 |
| 2003/0031141 A1* | 2/2003 | Schweinhart | H04B 7/18584 | 370/316 |
| 2003/0032391 A1* | 2/2003 | Schweinhart | H04B 7/18582 | 455/12.1 |
| 2003/0035385 A1* | 2/2003 | Walsh | H04B 7/18586 | 370/316 |
| 2003/0058165 A1* | 3/2003 | Li | H01Q 21/00 | 342/360 |
| 2003/0134592 A1* | 7/2003 | Franzen | H04B 7/2041 | 455/12.1 |
| 2004/0066347 A1* | 4/2004 | Schiff | H04B 7/18534 | 343/776 |
| 2004/0092227 A1* | 5/2004 | Sarraf | H04B 7/2041 | 455/12.1 |
| 2004/0185775 A1* | 9/2004 | Bell | H04B 7/18515 | 455/12.1 |
| 2005/0012655 A1* | 1/2005 | Lalezari | G01S 13/48 | 342/62 |
| 2005/0030227 A1* | 2/2005 | Shamsaifar | H01Q 3/36 | 342/373 |
| 2005/0035825 A1* | 2/2005 | Carson | H01Q 21/0025 | 333/117 |
| 2005/0101247 A1* | 5/2005 | Nishinaga | H04B 7/18521 | 455/11.1 |
| 2005/0227617 A1* | 10/2005 | Hoffmann | H03F 3/211 | 455/13.3 |
| 2005/0254527 A1* | 11/2005 | Jakel | H04L 47/50 | 370/539 |
| 2005/0271043 A1* | 12/2005 | Gastaldello | H04J 3/0623 | 370/357 |
| 2005/0272370 A1* | 12/2005 | Schiff | H04B 7/18534 | 455/13.3 |
| 2005/0273822 A1* | 12/2005 | Snell | H04N 7/17336 | 725/64 |
| 2006/0046638 A1* | 3/2006 | Takeuchi | H01Q 1/28 | 455/3.02 |
| 2007/0184849 A1* | 8/2007 | Zheng | H04B 7/06 | 455/456.1 |
| 2008/0008264 A1* | 1/2008 | Zheng | H04B 7/06 | 375/299 |
| 2008/0051080 A1* | 2/2008 | Walker | H04B 7/2041 | 455/427 |
| 2008/0233865 A1* | 9/2008 | Malarky | H04B 7/18515 | 455/12.1 |
| 2009/0009392 A1* | 1/2009 | Jacomb-Hood | H01Q 1/288 | 342/374 |
| 2009/0108930 A1* | 4/2009 | Gandhi | H03F 3/602 | 330/124 R |
| 2009/0231187 A1* | 9/2009 | Churan | H04B 7/2041 | 342/352 |
| 2009/0233545 A1* | 9/2009 | Sutskover | H01Q 3/26 | 455/25 |

(56) References Cited

U.S. PATENT DOCUMENTS

| | | | | |
|---|---|---|---|---|
| 2009/0247179 A1* | 10/2009 | Bell | .................... | H04B 7/18515 455/452.1 |
| 2010/0117903 A1* | 5/2010 | Zheng | .................. | H01Q 3/2605 342/373 |
| 2010/0120356 A1* | 5/2010 | Jin | ..................... | H04B 7/15535 455/7 |
| 2010/0148860 A1* | 6/2010 | Rhodes | ................... | H03F 3/602 330/2 |
| 2010/0164782 A1* | 7/2010 | Saha | .................. | H04B 7/18515 342/174 |
| 2010/0177678 A1* | 7/2010 | Sayegh | ............... | H04B 7/18513 370/315 |
| 2010/0194629 A1* | 8/2010 | Craig | .................... | H01Q 1/288 342/354 |
| 2010/0195467 A1* | 8/2010 | Ichiryu | ............. | G11B 7/00745 369/100 |
| 2010/0233973 A1* | 9/2010 | Churan | ............... | H01Q 3/2605 455/114.2 |
| 2010/0302971 A1* | 12/2010 | Walker | ............... | H04B 7/2041 370/252 |
| 2011/0045785 A1* | 2/2011 | Sutskover | ............... | H01Q 3/26 455/69 |
| 2011/0075601 A1* | 3/2011 | Zheng | ................... | H04B 7/086 370/316 |
| 2011/0102263 A1* | 5/2011 | Angeletti | ................ | H01Q 3/40 342/373 |
| 2011/0189947 A1* | 8/2011 | Miller | .................. | H04B 7/2041 455/12.1 |
| 2012/0129469 A1* | 5/2012 | Lorenz | ................ | H01Q 3/2605 455/73 |
| 2012/0212371 A1* | 8/2012 | Chang | .................. | H01Q 3/2605 342/373 |
| 2013/0115874 A1* | 5/2013 | Barthere | ............ | H04B 7/18508 455/12.1 |
| 2013/0148570 A1* | 6/2013 | Miller | ................... | H04W 88/04 370/316 |
| 2013/0182666 A1* | 7/2013 | Sutskover | ................ | H01Q 3/26 370/329 |
| 2013/0222184 A1* | 8/2013 | Chang | .................. | H01Q 3/2605 342/374 |
| 2014/0205042 A1* | 7/2014 | Kludt | ................. | H04B 7/061 375/299 |
| 2014/0225776 A1* | 8/2014 | Harel | ....................... | H01Q 3/00 342/373 |
| 2014/0225777 A1* | 8/2014 | Harel | ....................... | H01Q 3/00 342/373 |
| 2014/0226555 A1* | 8/2014 | Bell | .................. | H04B 7/18515 370/312 |
| 2014/0266870 A1* | 9/2014 | Koduru | ................. | H01Q 3/40 342/354 |
| 2014/0334580 A1* | 11/2014 | Chang | .......... | H01Q 3/2605 375/349 |
| 2014/0376450 A1* | 12/2014 | Miller | ............... | H04B 7/18519 370/316 |
| 2015/0158602 A1* | 6/2015 | Marshack | ............ | B64G 1/1085 244/158.4 |
| 2015/0158603 A1* | 6/2015 | Marshack | ............ | B64G 1/1085 244/158.4 |
| 2015/0188623 A1* | 7/2015 | Angeletti | ........... | H04B 7/18515 455/13.3 |
| 2015/0256128 A1* | 9/2015 | Moon | ....................... | H03F 3/19 330/124 R |
| 2015/0263803 A1* | 9/2015 | Amos | ................. | H04B 7/18582 370/316 |
| 2015/0341098 A1* | 11/2015 | Angeletti | ................. | H01Q 3/40 375/267 |
| 2017/0026961 A1* | 1/2017 | Hahn, III | ............. | H04B 7/2615 |
| 2017/0070308 A1* | 3/2017 | Hahn, III | ................. | H03F 1/02 |

* cited by examiner

SATELLITE BEAMFORMING

CROSS-REFERENCE TO RELATED APPLICATION

This application claims the benefit of U.S. Provisional Application No. 62/133,619, filed Mar. 16, 2015, the contents of which are herein incorporated by reference.

TECHNICAL FIELD

The following disclosure relates generally to a beamforming satellite communications system.

BACKGROUND

Some satellite communications systems provide multiple beams that connect diverse terrestrial regions through a satellite. In this context, a satellite may use multiple antenna radiating elements, which are also known as feeds or feed elements, in a phased array or as part of a reflector antenna, to form one or more communication beams for communicating with terrestrial devices in the coverage areas of the communication beams.

SUMMARY

The following disclosure describes a satellite system for adaptively forming a set of communication beams (also referred to simply as "beams") over a selected sub-area of a coverage region. The system includes a satellite that incorporates, in its output section, a beam former processor, a switching matrix circuitry, a hybrid matrix power sharing circuitry, and an antenna array feed structure. This combined output section of the satellite enables formation of selective beams flexibly within a wide field of view using the switching matrix circuitry and/or the hybrid matrix circuitry. The beams may be created dynamically in orbit to match changing traffic demands, and the signal power may be shared or switched among the formed beams. In this context, formation of beams by a satellite is referred to as beamforming. Control of the satellite for the flexible beamforming may be either ground-based (e.g., from an earth station), or space-based (e.g., from the satellite) through a command link.

In a general aspect, an apparatus comprises a plurality of amplifiers configured to output amplified signals; an array of feeds configured to form beams based on the amplified signals, wherein a total number of feeds in the array is greater than a total number of amplifiers in the plurality of amplifiers; and a switching circuitry configured to route the amplified signals to a subset of feeds in the array. The apparatus also comprises a beam former processor that is configured to receive, at a first time, a first group of signals for transmission through the plurality of amplifiers, wherein the first group of signals is less than a total number of feeds in the array. The beam former processor determines first terrestrial regions for transmitting the first group of signals. The beam former processor identifies a first subset of feeds that are configured to form beams covering the first terrestrial regions. The beam former processor controls the switching circuitry to route the first group of signals from the plurality of amplifiers to the first subset of feeds through the switching circuitry, such that the first subset of feeds are enabled to form beams that cover the first terrestrial regions based on the first group of signals.

Particular implementations may include one or more of the following features. The apparatus may include a beamforming satellite. Identifying the first subset of feeds may comprise identifying feeds equal in number to the first group of signals such that the beams formed by the identified feeds are configured to cover the first terrestrial regions with signal level above a predetermined threshold. The signal level may include at least one of signal power or signal gain.

Controlling the switching circuitry to route the first group of signals may comprise selecting, in the switching circuitry, a first group of switches that are configured to connect the plurality of amplifiers to the first subset of feeds. The first group of switches may be activated such that the first group of signals are routed from the plurality of amplifiers to the first subset of feeds through the first group of switches without routing the signals to other feeds outside the first subset of feeds.

A total number of switches in the switching circuitry may equal the total number of feeds in the array. Routing the first group of signals through the first group of switches may comprise determining, for each signal, one or more switches that form a forwarding path from an amplifier outputting the signal to a feed element identified for beamforming using the signal. The determining may be performed such that switches forming forwarding paths for every signal in the first group of signals are determined.

The plurality of amplifiers may be grouped into rings of amplifiers, each ring associated with a known subset of amplifiers in the plurality of amplifiers and a known subset of switches in the switching circuitry. The known subset of switches associated with a ring may be configured to route signals output by the known subset of amplifiers associated with the ring to a known subset of feeds. The known subset of switches may be preconfigured to receive signals from amplifiers associated with one or more known rings.

The beam former processor may be configured to receive, at a second time, a second group of signals for transmission through the plurality of amplifiers, wherein the second group of signals is less than a total number of feeds in the array. The beam former processor may determine second terrestrial regions for transmitting the second group of signals. The beam former processor may identify a second subset of the feeds that are configured to form beams covering the second terrestrial regions. The beam former processor may control the switching circuitry to route the second group of signals from the plurality of amplifiers to the second subset of the feeds through the switching circuitry such that the second subset of the feeds are enabled to form beams that cover the second terrestrial regions based on the second group of signals.

The second group of signals may be distinct from the first group of signals. The second terrestrial regions may be distinct from the first terrestrial regions. The second subset of the feeds may be distinct from the first subset of feeds. The configuration of the switching circuitry to route the second group of signals may be different from the configuration of the switching circuitry to route the first group of signals.

In another aspect, an apparatus comprises a plurality of amplifiers configured to output amplified signals and an array of feeds configured to form beams based on the amplified signals. The apparatus also includes a plurality of hybrid matrices. Each hybrid matrix is configured to receive one or more amplified signals at input ports from one or more amplifiers. The hybrid matrix is configured to forward a received signal to an individual feed coupled to an output port of the hybrid matrix in a first configuration of matrix circuitry, and is further configured to forward a received signal to a group of feeds coupled to output ports of the hybrid matrix in a second configuration of the matrix circuitry.

The apparatus also includes a beam former processor that is configured to receiving, at a first time, a first group of signals for transmission through the plurality of amplifiers. The beam former processor determines first terrestrial regions for transmitting the first group of signals. The beam former processor identifies a first subset of feeds that are configured to form beams covering the first terrestrial regions. The beam former processor determines whether all first terrestrial regions are covered by beams formed using the first subset of feeds. Based on determining that not all first terrestrial regions are covered by beams formed using the first subset of feeds, the beam former processor determines a subset of the first terrestrial regions for covering by grouping feeds. The beam former processor identifies, from the first subset of feeds, a second subset of feeds that are configured to form beams covering the subset of the first terrestrial regions.

The beam former processor controls hybrid matrices coupled to the second subset of feeds to group, in each hybrid matrix using the second configuration of the matrix circuitry, feeds that are coupled to the hybrid matrix and forwarding a respective received signal to the grouped feeds. The beam former processor controls hybrid matrices coupled to remaining feeds in the first subset of feeds to forward, in each hybrid matrix using the first configuration of the matrix circuitry, a respective received signal to an individual feed coupled to the hybrid matrix that is one of the remaining feeds in the first subset of feeds. The second subset of feeds and the remaining feeds in the first subset of feeds are enabled to form beams that cover the first terrestrial regions based on receiving the first group of signals from respective hybrid matrices.

Particular implementations may include one or more of the following features. The apparatus may include a beamforming satellite.

Each amplifier may be coupled to an input port of a single hybrid matrix. Identifying the first subset of feeds may comprise identifying, for each amplifier, feeds that are coupled to output ports of the hybrid matrix associated with the amplifier and selecting one of the identified feeds for receiving the signal output by the amplifier.

Determining whether all first terrestrial regions are covered by beams formed using the first subset of feeds may comprise determining whether the beams formed using the first subset of feeds can transmit the signals to the first terrestrial regions with signal level above a predetermined threshold. The signal level may include at least one of signal power or signal gain.

Determining the subset of the first terrestrial regions for covering by grouping feeds may comprise determining one or more of the first terrestrial regions that are lower in priority than remaining first terrestrial regions, such that signals can be transmitted to the one or more of the first terrestrial regions that are lower in priority with lower signal level compared to signals that are transmitted to remainder of the first terrestrial regions. The lower signal level may be above the predetermined threshold.

The beam former processor may be configured to further receive, at a second time, a second group of signals for transmission through the plurality of amplifiers. The beam former processor may determine second terrestrial regions for transmitting the second group of signals. The beam former processor may identify a third subset of feeds that are configured to form beams covering the second terrestrial regions. The beam former processor may determine whether all second terrestrial regions are covered by beams formed using the third subset of feeds. Based on determining that all second terrestrial regions are not covered by beams formed using the third subset of feeds, the beam former processor may determine a subset of the second terrestrial regions for covering by grouping feeds. The beam former processor may identify, from the third subset of feeds, a fourth subset of feeds that are configured to form beams covering the subset of the second terrestrial regions. The beam former processor may control hybrid matrices coupled to the fourth subset of feeds to group, in each hybrid matrix using the second configuration of the matrix circuitry, feeds that are coupled to the hybrid matrix and forwarding a respective received signal to the grouped feeds. The beam former processor may control hybrid matrices coupled to remaining feeds in the second subset of feeds to forward, in each hybrid matrix using the first configuration of the matrix circuitry, a respective received signal to an individual feed coupled to the hybrid matrix that is one of the remaining feeds in the second subset of feeds. The third subset of feeds and the remaining feeds in the second subset of feeds may be enabled to form beams that cover the second terrestrial regions based on the second group of signals.

The second group of signals may be distinct from the first group of signals. The second terrestrial regions may be distinct from the first terrestrial regions. The first, second, third and fourth subsets of feeds may be distinct from one another.

In another aspect, an apparatus comprises a plurality of amplifiers configured to output amplified signals and an array of feeds configured to form beams based on the amplified signals. A total number of feeds in the array is greater than a total number of amplifiers in the plurality of amplifiers. The apparatus also comprises a switching circuitry configured to route the amplified signals to a subset of feeds in the array.

The apparatus further comprises a plurality of hybrid matrices. Each hybrid matrix is configured to receive one or more amplified signals at input ports from one or more amplifiers through the switching circuitry. The hybrid matrix forwards a received signal to an individual feed coupled to an output port of the hybrid matrix in a first configuration of matrix circuitry. The hybrid matrix forwards a received signal to a group of feeds coupled to output ports of the hybrid matrix in a second configuration of the matrix circuitry.

The apparatus also comprises a beam former processor that is configured to receive, at a first time, a first group of signals for transmission through the plurality of amplifiers, where the first group of signals is less than a total number of feeds in the array. The beam former processor determines first terrestrial regions for transmitting the first group of signals. The beam former processor identifies a first subset of feeds that are configured to form beams covering the first terrestrial regions. The beam former processor determines whether all first terrestrial regions are covered by beams formed using the first subset of feeds. Based on determining that not all first terrestrial regions are covered by beams formed using the first subset of feeds, the beam former processor determines a subset of the first terrestrial regions for covering by grouping feeds. The beam former processor identifies, from the first subset of feeds, a second subset of feeds that are configured to form beams covering the subset of the first terrestrial regions.

The beam former processor controls the switching circuitry to route the first group of signals from the plurality of amplifiers to a first group of hybrid matrices coupled to the first subset of feeds through the switching circuitry. The beam former processor controls a subset of the first group of hybrid matrices that are coupled to the second subset of feeds to group, in each hybrid matrix using the second configuration of the matrix circuitry, feeds that are coupled to the hybrid matrix and forwarding a respective received signal to the grouped feeds. The beam former processor controls a remainder of the first group of hybrid matrices that are coupled to remaining feeds in the first subset of feeds to forward, in each hybrid matrix using the first configuration of the matrix circuitry, a respective received signal to an individual feed coupled to the hybrid matrix that is one of the remaining feeds in the first subset of feeds. The second subset of feeds and the remaining feeds in the first subset of feeds are enabled to form beams that cover the first terrestrial regions based on receiving the first group of signals from respective hybrid matrices.

Particular implementations may include one or more of the following features. The apparatus may include a beamforming satellite.

Identifying the first subset of feeds may comprise identifying feeds equal in number to the first group of signals such that the beams formed by the identified feeds are configured to cover the first terrestrial regions with signal level above a predetermined threshold. The signal level may include at least one of signal power or signal gain.

Controlling the switching circuitry to route the first group of signals may comprise selecting, in the switching circuitry, a first group of switches that are configured to connect the plurality of amplifiers to the first group of hybrid matrices. The first group of switches may be activated such that the first group of signals are routed from the plurality of amplifiers to the first group of hybrid matrices through the first group of switches without routing the signals to other hybrid matrices outside the first group of hybrid matrices.

A total number of switches in the switching circuitry may equal the total number of feeds in the array. Routing the first group of signals using the first group of switches may comprise determining, for each signal, one or more switches that forms a forwarding path from an amplifier outputting the signal to a hybrid matrix coupled to a feed element identified for beamforming using the signal. The determining may be performed such that switches forming forwarding paths for every signal in the first group of signals are determined.

The plurality of amplifiers may be grouped into rings of amplifiers, each ring associated with a known subset of amplifiers in the plurality of amplifiers and a known subset of switches in the switching circuitry. The known subset of switches associated with a ring may be configured to route signals output by the known subset of amplifiers associated with the ring to a known subset of hybrid matrices coupled to a known subset of feeds. The known subset of hybrid matrices may be preconfigured to receive signals from amplifiers associated with one or more known rings.

Each amplifier may be coupled to an input port of one or more hybrid matrices. Identifying the first subset of feeds may comprise identifying, for each amplifier, a feed for receiving the signal output by the amplifier and determining a hybrid matrix that is coupled to the identified feed.

Determining whether all first terrestrial regions are covered by beams formed using the first subset of feeds may comprise determining whether the beams formed using the first subset of feeds can transmit the signals to the first terrestrial regions with signal level above a predetermined threshold. The signal level may include at least one of signal power or signal gain.

Determining the subset of the first terrestrial regions for covering by grouping feeds may comprise determining one or more of the first terrestrial regions that are lower in priority than remaining first terrestrial regions, such that signals can be transmitted to the one or more of the first terrestrial regions that are lower in priority with lower signal level compared to signals that are transmitted to remainder of the first terrestrial regions. The lower signal level may be above the predetermined threshold.

The beam former processor may be configured to further receive, at a second time, a second group of signals for transmission through the plurality of amplifiers. The second group of signals may be less than a total number of feeds in the array. The beam former processor may determine second terrestrial regions for transmitting the second group of signals. The beam former processor may identify a third subset of feeds that are configured to form beams covering the second terrestrial regions. The beam former processor may determine whether all second terrestrial regions are covered by beams formed using the third subset of feeds. Based on determining that all second terrestrial regions are not covered by beams formed using the third subset of feeds, the beam former processor may determine a subset of the second terrestrial regions for covering by grouping feeds. The beam former processor may identify, from the third subset of feeds, a fourth subset of feeds that are configured to form beams covering the subset of the second terrestrial regions.

The beam former processor may control the switching circuitry to route the second group of signals from the plurality of amplifiers to a second group of hybrid matrices coupled to the third subset of feeds through the switching circuitry. The beam former processor may control a subset of the second group of hybrid matrices that are coupled to the fourth subset of feeds to group, in each hybrid matrix using the second configuration of the matrix circuitry, feeds that are coupled to the hybrid matrix and forwarding a respective received signal to the grouped feeds. The beam former processor may control a remainder of the second group of hybrid matrices that are coupled to remaining feeds in the third subset of feeds to forward, in each hybrid matrix using the first configuration of the matrix circuitry, a respective received signal to an individual feed coupled to the hybrid matrix that is one of the remaining feeds in the third subset of feeds. The fourth subset of feeds and the remaining feeds in the third subset of feeds may be enabled to form beams that cover the second terrestrial regions based on receiving the second group of signals from respective hybrid matrices.

The second group of signals may be distinct from the first group of signals. The second terrestrial regions may be distinct from the first terrestrial regions. The first, second, third and fourth subsets of feeds may be distinct from one another. The second group of hybrid matrices may be distinct from the first group of hybrid matrices. The configuration of the switching circuitry to route the second group of signals may be different from the configuration of the switching circuitry to route the first group of signals.

Implementations of the above techniques include methods, systems, computer program products and computer-readable media. One such method includes one or more of the above-described actions. One such computer program product is suitably embodied in a non-transitory machine-readable medium that stores instructions executable by one or more processors. The instructions are configured to cause the one or more processors to perform the above-described actions. One such computer-readable medium stores instructions that, when executed by a processor, are configured to cause the processor to perform the above-described actions. One such system comprises a satellite that includes a processor and instructions stored in a machine-readable medium that, when executed by the processor, are configured to cause the processor to perform one or more of the above-described actions.

The details of one or more disclosed implementations are set forth in the accompanying drawings and the description below. Other features, aspects, and advantages will become apparent from the description, the drawings and the claims.

BRIEF DESCRIPTION OF THE DRAWINGS

Like reference symbols in different figures indicate like elements.

DETAILED DESCRIPTION

Figure 1:
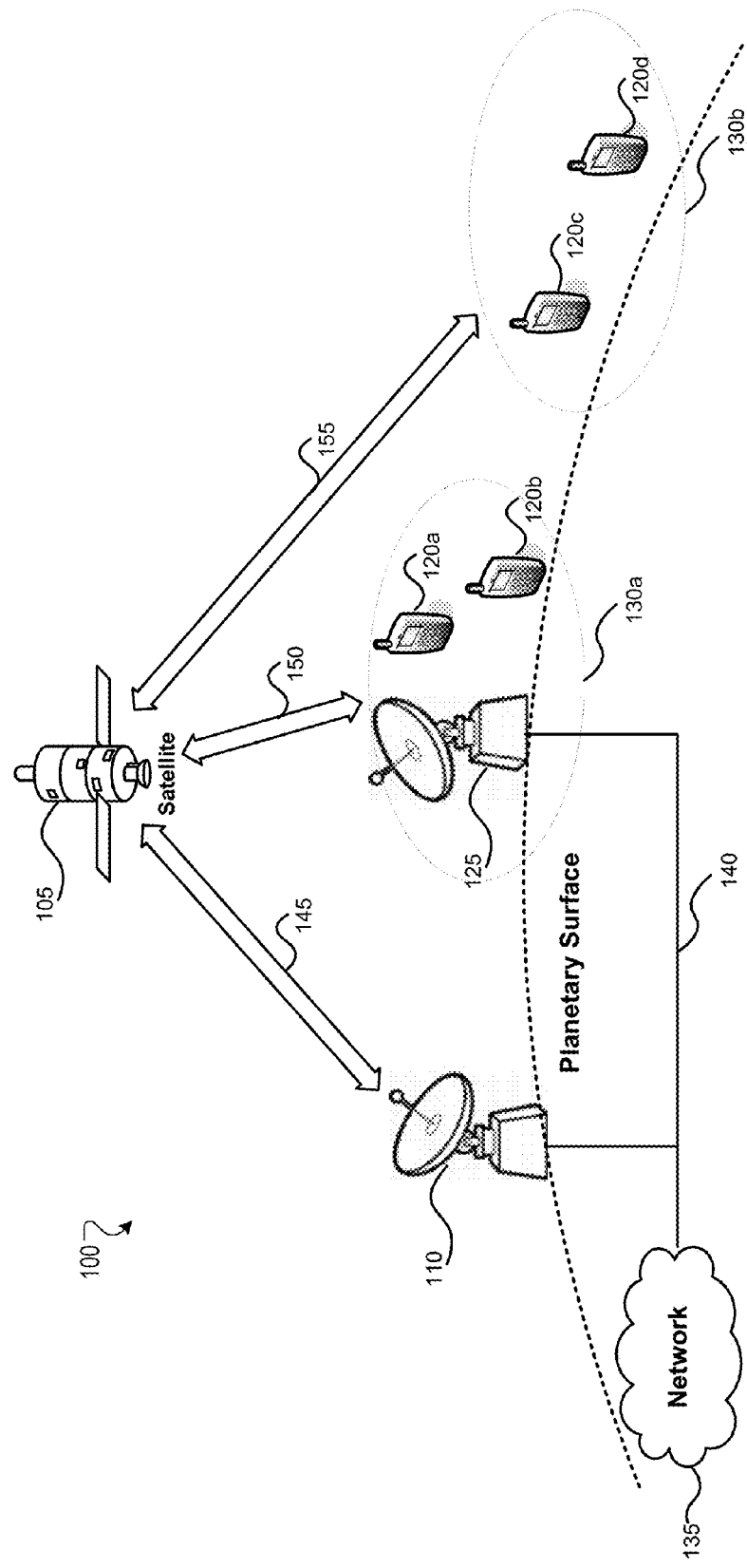
FIG. 1 illustrates an exemplary satellite system that is used for flexible beamforming.

In a satellite communications system, a satellite may transmit signals to or receive signals from terrestrial devices. For example, the satellite may receive a signal from a gateway, e.g., a ground station that communicates with the satellite and with a terrestrial network, and then broadcast the signal to one or more ground terminals, e.g., satellite dishes along with their associated computer systems in customer locations. The satellite may use multiple antenna radiating elements or feeds, in, for example, a phased array antenna or as part of a reflector antenna, to form one or more beams for communicating with terrestrial devices. The beams provide signals through the satellite to interconnect diverse terrestrial regions.

A radiating element or feed refers to a resonating structure that is designed to transmit or receive electromagnetic energy in a frequency band (e.g., a microwave frequency band). In a traditional beamforming satellite system, a signal stream is divided among each of the feeds. Beamforming is implemented by adjusting the relative phase and/or gain of each signal path routed to each feed to thereby enable the energy radiated by each transmitting feed to be coherently combined to create a beam pattern composed of one or more beams. The same approach can also be used in the receive direction where the received signals from each receiving feed are coherently combined to create the beam pattern. The adjustments to each signal path may be determined based on determining the desired output of each feed and then determining the adjustments to the relative phase and/or gain of each signal path to produce the desired output.

A beam may be defined by a set of real or complex coefficients applied across the feeds of a satellite, or applied across the outputs of the high power amplifiers (HPAs) that are connected to the feeds and provide amplified signal streams to the feeds for transmission. The feed beam coefficients may be determined based on satisfying a required minimum average power over a region covered by the beam. For a given beam, each feed may, for example, be assigned its own beam coefficients such that energy at a given beam frequency that is radiated by the feed will have the proper relative phase and relative magnitude to coherently combine with energy radiated by other feeds to form the particular beam. In some implementations, a feed beam coefficient may be expressed as a complex number that indicates an amplitude and phase of the signal radiated by the corresponding feed.

The set of complex coefficients applied across the outputs of the HPAs may be referred to as HPA beam coefficients. In contrast to the feed beam coefficients, the values of the HPA beam coefficients may specify the amplitude and phase of the output of each HPA for each beam. Notably, while the feed beam coefficients specify the amplitude and phase of the signals outputted by the feeds of the satellite, the HPA beam coefficients, in contrast, specify the amplitude and phase of the signals outputted by the HPAs of the satellite. HPA beam coefficients are described in greater detail in U.S. application Ser. No. 13/690,848, titled "EIRP-Based Beamforming," which is incorporated by reference herein in its entirety.

Beamforming may be accomplished onboard the satellite by constructing a beamforming network behind the feed array using one or more beam former processors on board the satellite. A beam former processor computes coefficients for each intended beam. For each feed, the processor applies the beam coefficient computed for the feed to the signal that is transmitted by the feed. The processor sends the signal to the feed through an HPA that can be connected to the feed. In this manner, the processor applies the computed coefficients to the feeds to generate the desired beams for transmission of signals to terrestrial coverage regions. The above mechanism for beamforming may be referred to as space-based beamforming.

Additionally or alternatively, the beamforming may be accomplished using a ground-based beamforming (GBBF) system (i.e., a system on Earth) that computes the coefficients. The GBBF system may create the beams by applying the coefficients to the signals, and sending the beams to the satellite for transmission using the respective HPA/feed element combination. Alternatively, the GBBF system may send the coefficients to a beam former processor on board the satellite for application to respective feed signals for creating the beams on board the satellite.

The power and gain of satellite transmission at a particular terrestrial location depends on the number of beams formed by the satellite. Typically, with a greater number of beams, the power and gain at a particular location will be greater as compared to the case with a smaller number of beams. For example, a satellite that can form 96 beams can provide coverage at a particular terrestrial location with a certain level of power and gain. In contrast, a satellite that forms 48 beams, while it may provide coverage at the same terrestrial location, the power and gain available at the location may be less compared to the 96-beams case, since the total power available for the 48 beams may be less than the total power available for the 96 beams. In some implementations, the power and gain with the lesser number of beams may be less than an acceptable threshold for meaningful reception of the satellite signal.

The number of beams formed by a satellite depends on various factors, including the number of feeds, the number of HPAs connected to the feeds, and the processing capabilities of the beam former processor that sends signals to the feeds. Generally speaking, an increase in the number of feeds in the satellite typically increases the terrestrial surface area in which the satellite is able to create beams, which is hereinafter referred to as the field of view of the satellite, and typically decreases the size of the smallest individual beam that can be produced by the satellite within its field of view. In a best-possible scenario, the satellite will have as many HPAs as the number of feeds, and the beam former processor will be able to simultaneously forward an equal number of signals to the feeds through the HPAs. In such a situation, every feed on board the satellite is energized to form its own beam powered by an HPA that is exclusively coupled to the feed. Accordingly, with a large number of feeds (e.g., 96 or 128) and an equal number of HPAs that are all simultaneously forwarding to the feeds active signals from the beam former processor, the power and gain of satellite transmission at a particular terrestrial location may be sufficiently above an acceptable threshold for meaningful reception of the satellite signal.

However, in some situations it may be the case that the processing power of a beam former processor on board a satellite is constrained, such that the number of active signals that can be processed by the beam former processor is less than the number of feeds that are available on the satellite. While additional beam former processors may be considered for addressing the excess feeds that a single processor cannot simultaneously support, this can lead to synchronization issues, and therefore beams may not be coherently formed using more than one processor. Additional processors and associated circuitry also may cost more, and increase the weight of the satellite, which can led to increased overall cost.

Additionally or alternatively, the number of HPAs on board the satellite may be less than the number of feed elements available. This may be the case, for example, due to constraints on the total weight of HPAs that the satellite can support, and also may be due to limitations on the total cost of the HPAs, among other factors.

In some cases, given the above constraints on the beam former processor capabilities and the number of HPAs, the number of feeds that can be simultaneously energized for beamforming may be less than the total number of feeds on board the satellite. In such cases, it may be useful to provide switching circuitry on board the satellite that allows that beam former processor to select a subset of the feeds for beamforming at a time, and switch the signals output by the HPAs to the selected subset of the feeds. The feeds may be selected such that the coverage areas of these feeds correspond to targeted terrestrial regions where power and gain of the signals exceeding certain acceptable thresholds are needed at the time. Energizing a subset of the feeds in this manner facilitates focusing the energies of the beams formed by the satellite in the terrestrial regions where they are needed, given the constraint that the total number of beams formed by the satellite is limited by the number of active signals the beam former processor can handle at a time, and also potentially limited by the number of HPAs.

In some cases, forming beams using a subset of the feeds may lead to uneven coverage of targeted terrestrial regions, such that the power and gain of the signals in some of these regions may fall below acceptable thresholds. Due to the limitation on the processing power of the beam former processor, and/or the limitation on the number of HPAs, additional distinct beams (i.e., with separate beamforming coefficients) may not be formed to provide increased signal power and gain in the regions where the signal power and gain fall below acceptable thresholds. In such cases, it may be useful to provide pairing circuitry on board the satellite that allows that beam former processor to pair groups of feeds, with the output of an HPA connected to a paired group of feeds, such that the same signal is transmitted through these paired feeds. The paired feeds form beams with identical beamforming coefficients in their respective coverage areas. By pairing the feeds and transmitting the same signal through the paired feeds in this manner, terrestrial regions where the signal power and gain previously were below acceptable thresholds, may now receive greater signal power and gain that meets the threshold values.

The following sections describe satellite configurations that include switching circuitry, or pairing circuitry, or both, for beamforming in a flexible manner using a subset of the available feeds. The switching circuitry may be used in conjunction with the pairing circuitry, or they may be used independently. Using the switching circuitry and/or the pairing circuitry, a beam former processor handling a limited number of active signals at a time can control a limited number of HPAs to successively form different coverage beams by energizing subsets of a larger number of feeds, thereby covering a much wider field of view of the satellite antenna.

FIG. 1 illustrates an exemplary satellite system 100 that is used for flexible beamforming. The satellite system 100 includes a satellite 105 connected through satellite channels to gateways 110 and 125, and ground terminals 120*a*, 120*b*, 120*c* and 120*d*, which are located on a planetary surface, e.g., the surface of the Earth. The satellite 105 transmits data to and receives data from the gateways 110, 125, ground terminals 120*a*, 120*b*, 120*c* and 120*d*. Gateway 125 and ground terminals 120*a* and 120*b* are within terrestrial region 130*a* that is covered by a formed beam. Ground terminals 120*c* and 120*d* are within terrestrial region 130*b* that is covered by another formed beam. That is, gateway 125 and ground terminals 120*a* and 120*b* are located within the geographic extent covered by beam 130*a*, while ground terminals 120*c* and 120*d* are located within the geographic extent covered by beam 130*b*. The gateways 110 and 125 are terrestrially connected to each other and to a terrestrial network 135 through communications link 140.

The satellite 105 may be located at any one of a low earth orbit (LEO), a medium earth orbit (MEO), or a geostationary orbit (GEO) location defined by a longitude. While only a single satellite 105 is shown, the system 100 may include a plurality of satellites in some implementations. The satellite 105 interconnects the gateway 110, the gateway 125 and the ground terminals 120*a*, 120*b* in beam 130*a*, and the ground terminals 120*c*, 120*d* in beam 130*b*, through satellite communications channels. While only two gateways 110 and 125 are shown, a plurality of gateways may be employed.

The satellite 105 includes multiple antenna radiating elements or feeds to form beams for transmission of information in both directions from the satellite 105 to the gateways or ground terminals. The satellite 105 includes one or more beam former processors to process active signal streams for beamforming. The satellite also includes multiple HPAs that receive the active signal streams from the beam former processor, and forwards the signal streams with amplification to feeds that are connected to the HPAs. The feeds transmit signals to or receive signals from the gateways 110, 125 and the ground terminals 120a-120d using the formed beams. A beam may include one or more gateways (e.g., beam 130a) within its coverage area, or a beam may include zero gateways (e.g., 130b). A beam may be a receive beam when used by the satellite to receive signals and a transmit beam when used by the satellite to transmit signals.

While only two beams 130a and 130b are shown, more than two beams may be active at a time, and any number of ground terminals may be used distributed amongst a plurality of beam coverage areas. The number of beams that can be simultaneously active depends on the number of signals that the beam former processor can handle at a time, which, in some implementations, may be limited by the finite processing power of the beam former processor. Additionally or alternatively, the number of beams that are simultaneously formed by the satellite may be limited by the number of HPAs that are available for sending amplified signals to the feeds. In some implementations, the satellite 105 includes a number of feeds that is greater than a number of active signal streams that the beam former processor can handle at a time, and/or greater than a number of HPAs that are available on the satellite. For example, in one implementation, the satellite 105 includes 96 feeds. However, the beam former processor on board the satellite is capable of processing active signal streams for only 48 feeds. Additionally or alternatively, the satellite 105 includes 48 HPAs on board. Accordingly, at a time 48 distinct beams can be formed using a subset of the 96 feeds.

The satellite 105 includes switching circuitry, e.g., one or more switching matrices, which is used by the beam former processor to select a subset of the feeds for connections through the HPAs, the active signals being sent by the beam former processor from the HPAs to the selected subset of feeds by routing through the switching matrices. Additionally, the satellite 105 includes pairing circuitry, e.g., multiple hybrid pairing matrices, which are coupled to the feeds. Each hybrid pairing matrix is used for extending the coverage area of a beam by sending the same corresponding beamforming signal through multiple feed elements that are paired using the hybrid pairing matrix. In this manner, the satellite 105 can provide adequate coverage to all targeted terrestrial regions using a subset of the feeds that are available on board.

The following sections describe configurations of the satellite 105 that includes one beam former processor. However, in some implementations, more than one beam former processor may be included in the satellite. In such cases, the satellite may include logic to operate the multiple beam former processors simultaneously for beamforming with synchronization between the signals processed by the different processors.

In implementations described in the following sections, the beamforming may be accomplished by space-based beamforming, i.e., on board the satellite, or ground-based beamforming (GBBF), e.g., using a system on Earth. In space-based beamforming, a beam former processor in the satellite 105 may compute the coefficients for the beams corresponding to the signals and control the HPA/feeds to form the beams using the computed coefficients. In a GBBF system, the beam coefficients are computed by one or more processing systems on the ground. In some implementations, the GBBF system may create the beams by applying the coefficients to the signals, and then send beams to the satellite for transmission by forwarding through HPAs to the feeds. In some other implementations, the GBBF system may send the coefficients to a beam former processor onboard the satellite. The beam former processor applies the coefficients to the active signal streams and control the HPAs and feeds for creating the beams. In either space-based beam forming or GBBF, the beam former processor controls switching and/or pairing circuitry onboard the satellite to forward the signals with the beam coefficients from the HPAs to selected feeds for beamforming in the targeted terrestrial regions.

In some implementations, the satellite 105 includes multiple reflecting dishes for reflecting or redirecting the energy used to form the beams. A reflecting dish may be configured to redirect the beam formed by a given set of feeds. The spot beams 130a and 130b may be formed by different reflecting dishes redirecting the energy of their respective feeds. In an alternative implementation, the orientation of the reflecting dishes may be configured such that the spot beams 130a and 130b are combined together to form a single spot or shaped beam covering a contiguous geographical area on the Earth's surface.

The reflecting dishes in the satellite 105 may be mounted on, for example, gimbals to enable the satellite to dynamically rotate the reflecting dishes to change the beam locations on the surface of the Earth after satellite deployment and during subsequent satellite operation. This ability to rotate the reflecting dishes enables the satellite 105 to dynamically change its field of view during operation and, thereby, provides the satellite with much greater communications services coverage flexibility than typical reflecting satellites in that the satellite 105 is able to place beams in a much greater portion of the hemisphere of the Earth closest to the satellite by rotating the reflecting dishes as needed during satellite operation. Implementations using rotatable reflecting dishes are described in greater detail in U.S. application Ser. No. 13/762,784, titled "Satellite Beamforming," which is incorporated herein by reference in its entirety.

As noted previously, a subset of the feeds in the satellite 105 may be used for transmission in the forward direction from the satellite 105 to the gateways 110 and 125, and the ground terminals 120a-120d. These feeds are referred to as the forward link elements, transmit elements, or forward link feeds. The remaining feeds may be used for transmission in the return direction from the gateways 110, 125 and the ground terminals 120a-120d to the satellite 105. These feeds are referred to as the return link elements, return link feeds, receive elements, or receiving feeds.

The gateways 110 and 125 are coupled to the network 135 through a communications link 140. The network 135 may be a non-public data network, a public data network or a combination of public and non-public data networks, e.g., the Internet. The communications link 140 may be a high-speed terrestrial connection, such as an optical connection with data rates in the range of gigabits per second. In an alternative implementation, the communications link 140 also may be a satellite communications channel through a satellite that is different from the satellite 105. The communications link 140 may be part of a closed network accessible only to components of the satellite communications system 100, or may be part of an open network that connects the gateway 110 to the network 135.

The gateways 110 and 125 may include one or more modules that process signals exchanged with the satellite elements for beamforming. In some implementations, the gateways 110 and 125 may transmit signals to the satellite 105 over the satellite return links for phase and/or gain calibration for the return link and the forward link. This may be the case, for example, when a GBBF system is employed. The signals used for phase and/or gain calibration may include unique code words that identify such signals as being configured for phase and/or gain calibration. The satellite 105 may measure the phase and gain of the transmitted calibration signals to enable calibration and/or pointing correction. The communications link 140 may be part of a closed network accessible only to components of the satellite communications system 100, or may be part of an open network that connects the gateway 110 to the network 135.

The ground terminals 120a-120d are computing devices or systems able to communicate data to and from the satellite 105 over a satellite link. In some implementations, one or more of the ground terminals 120a-120d may be enterprise terminals. For example, a ground terminal can be a satellite dish that provides network connectivity to multiple devices at a location, such as an office building. In some implementations, one or more of the ground terminals 120a-120d may be individual user terminals. For example, a ground terminal can be a handheld mobile telephone or car phone, a laptop computer, desktop computer, or a phone booth. The ground terminals in separate satellite coverage areas serviced by different formed beams communicate with each other and with the gateways 110 and 125 over the satellite 105 via the satellite links 145, 150 and 155. Each satellite link 145, 150 or 155 includes both an uplink to the satellite 105 and a downlink from the satellite 105.

Figure 2A:
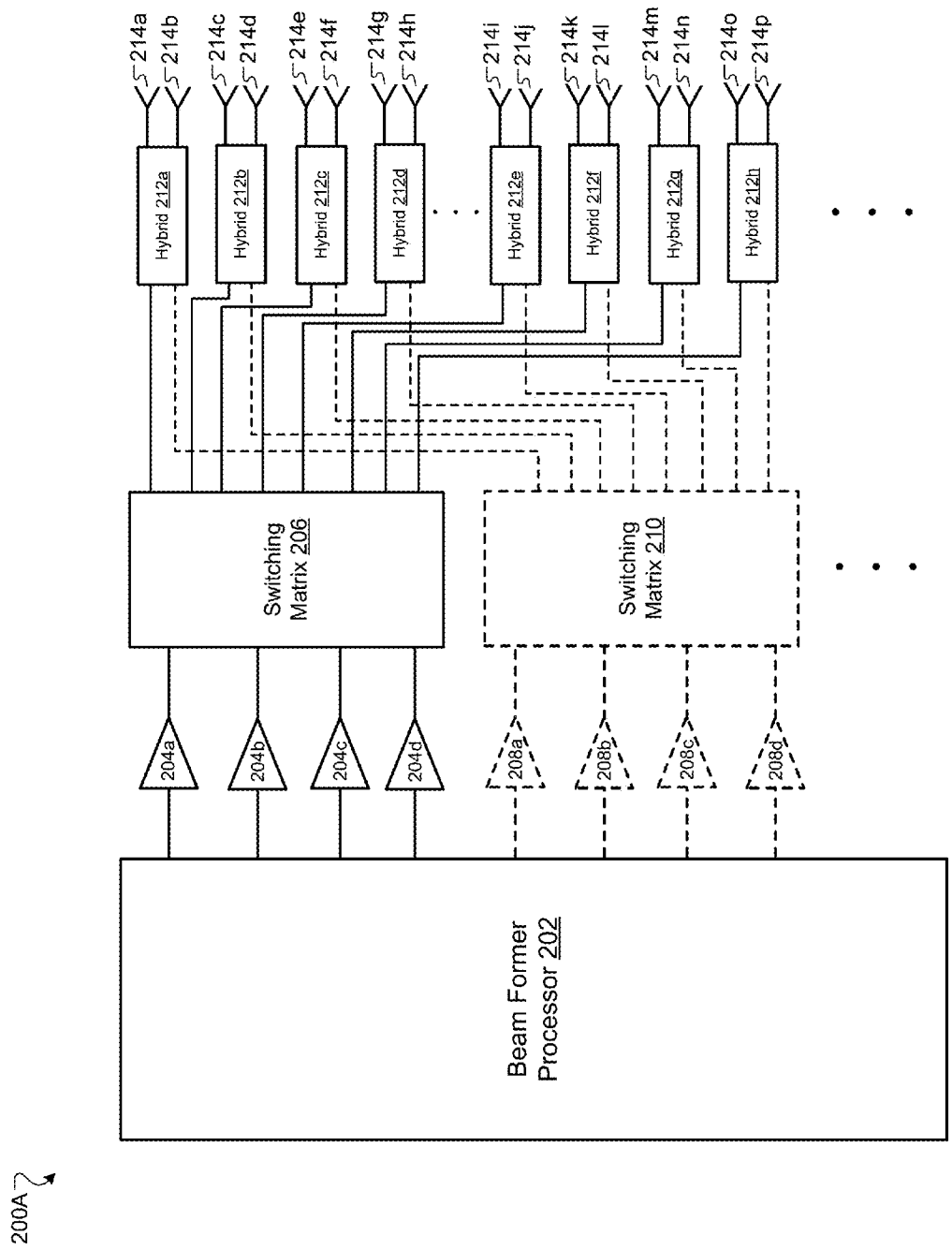
FIGS. 2A, 2B and 2C illustrate example configurations of a satellite output section used for flexible beamforming.
Figure 2B:
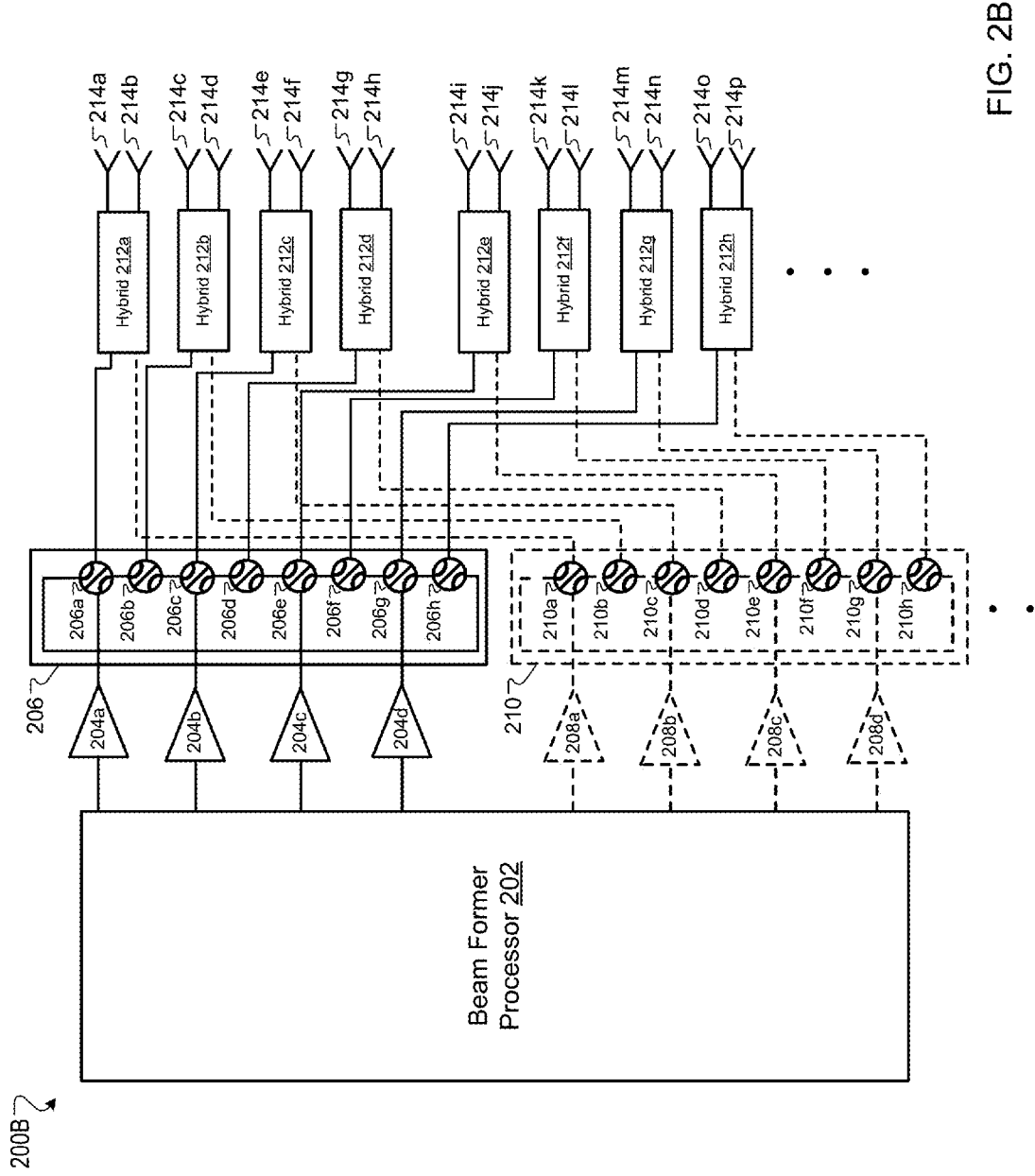
Figure 2C:
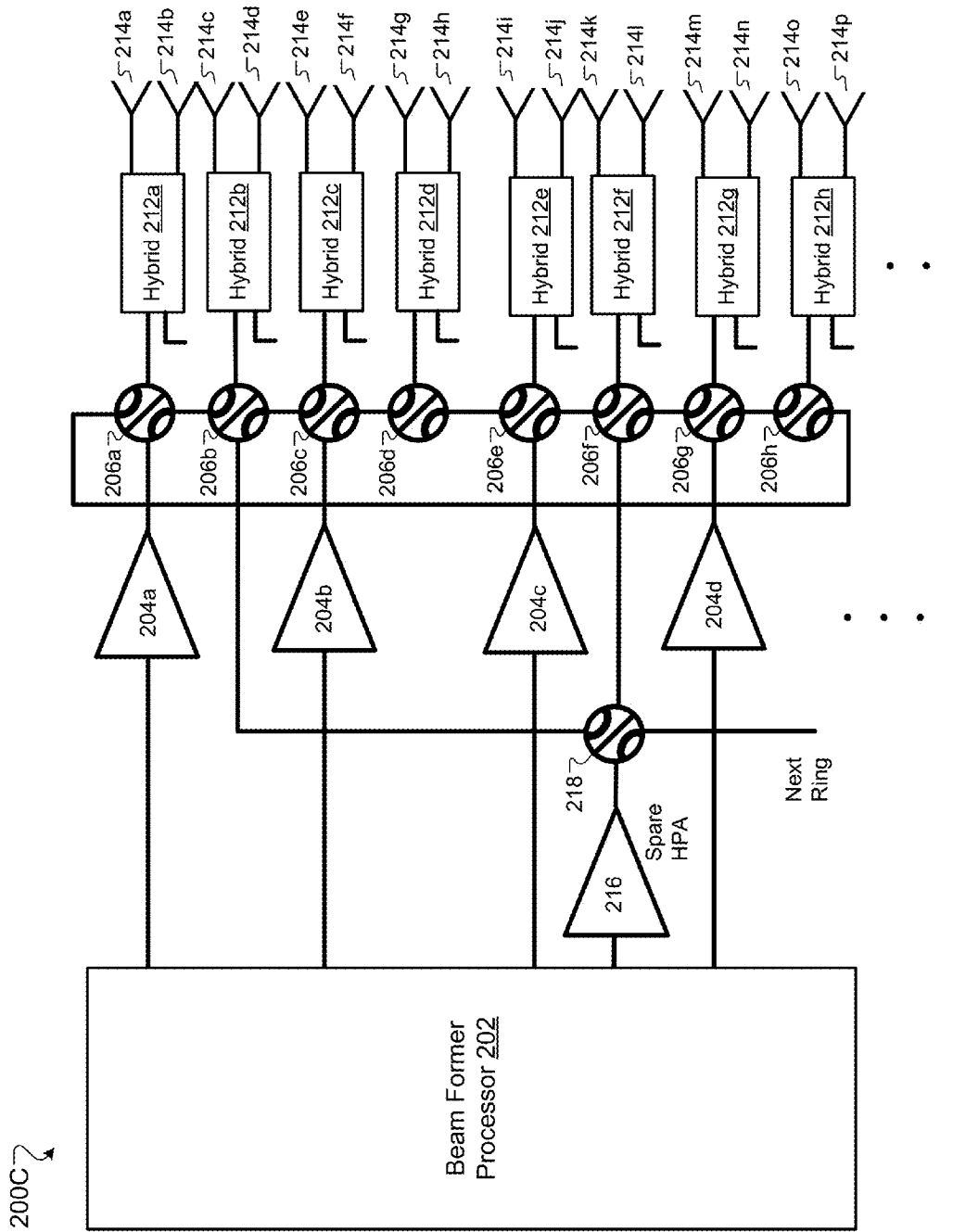

FIGS. 2A, 2B and 2C illustrate example configurations 200A, 200B and 200C respectively of a satellite output section used for flexible beamforming. The example configurations shown in FIG. 2A, 2B or 2C can be used for beamforming in a flexible manner, by routing the signals from a smaller number of HPAs to a subset of a greater number of feeds using switching matrices. Additionally or alternatively, some of the feeds can be paired using one or more hybrid matrices to extend the coverage area of the subset of feeds. In some implementations, the satellite output section shown in FIG. 2A, 2B or 2C can be an output section of the satellite 105.

FIG. 2A shows a block diagram of an example satellite output section 200A. The output section 200A includes, among other components, a beam former processor 202, a first set of HPAs 204a-204d, a second set of HPAs 208a-208d, switching matrices 206 and 210, hybrid matrices 212a-212h, and feeds 214a-214p.

Each switching matrix is a dynamic M×N switching matrix that connects M HPAs at its input to N hybrid matrices at its output, where M may be less than or equal to N. A switching matrix includes a plurality of switches for performing the switching from the M amplified signals output by the M HPAs to a subset of the available feeds using a subset of the N hybrid matrices. The switching matrices 206 and 210 in the example configuration 200A are 4×8 matrices. In this configuration, each switching matrix connects four HPAs at its input to four out of eight hybrid matrices at its output. For example, switching matrix 206 connects the first set of four HPAs 204a-204d to four out of the eight hybrid matrices 212a-212h. Similarly, switching matrix 210 connects the second set of four HPAs 208a-208d to four out of the eight hybrid matrices 212a-212h. In some implementations, each of the 4×8 switching matrices 206 or 210 uses eight switches to connect the four HPAs at its input to the eight hybrid matrices at its output. In these implementations, each HPA is coupled to two switches, with the output of each switch coupled to a different hybrid matrix, thereby enabling each HPA to be connected to one of two different hybrid matrices. This is described in greater detail in the following sections. For example, the HPA 204a may be connected, through the switching matrix 206, to two hybrid matrices 212a and 212e. Accordingly, the amplified signal output by HPA 204a is switched, using switches in the matrix 206, to either hybrid matrix 212a or hybrid matrix 212e.

Each hybrid matrix, in turn, forwards a HPA signal received at one of its input ports to a feed that is coupled to the hybrid matrix. For example, hybrid matrix 212a may be connected, at one of its input ports, to HPA 204a through a switch in the switching matrix 206. The hybrid matrix 212a is coupled to feeds 214a and 214b at its output ports. The hybrid matrix 212a may receive an amplified signal from the HPA 204a at the corresponding input port. In one configuration, when the feeds are not paired, the hybrid matrix 212a may forward the amplified signal to one of the feeds 214a or 214b. In another configuration where the two feeds 214a and 214b are paired, the hybrid matrix 212a may forward the amplified signal to both feeds 214a or 214b, with the signal power being shared between the two feeds.

Although FIG. 2A shows 4×8 switching matrices, other configurations are also possible. For example, a switching matrix may be a 4×16 switching matrix, an 8×16 switching matrix, or some other suitable configuration. A 4×16 switching matrix connects four HPAs at its input to 16 hybrid matrices at its output. In some implementations, this may be achieved by using 16 switches in the 4×16 matrix. Each HPA may be connected to four switches, with the output of each switch coupled to a different hybrid matrix, thereby enabling each HPA to be connected to one of four different hybrid matrices.

The switching matrices, e.g., 206 and 210, among others, form the switching circuitry of the satellite output section. In some implementations, these switching matrices, e.g., 206 and 210, among others, together may be considered as a switching matrix, with each of 206 and 210 being sub-matrices of the overall switching matrix.

In the example configuration 200A, each of the hybrid matrices 212a-212h is a 2×2 hybrid pairing matrix, which includes two input ports and two output ports. As shown, a 2×2 hybrid pairing matrix can receive signal streams from two different HPAs at its two input ports, and forward the signal streams to the two feeds at its two output ports. For example, the hybrid matrix 212a may be connected to HPA 204a and HPA 208a through the switching matrices 206 and 210 respectively. Accordingly, the hybrid matrix 212a can receive at its input ports two distinct signals from HPAs 204a and 208a. The hybrid matrix 212a can send one signal to feed 214a, and the other signal to feed 214b. In some implementations, one of the two feeds 214a or 214b may be energized at a time, such that a single beam may be formed at an instant in time using the signals transmitted through matrix 212a. In other implementations, both feeds 214a or 214b may be energized at a time, such that two distinct beams may be formed at an instant in time using the two signals transmitted through matrix 212a.

Alternatively, a 2×2 hybrid matrix can receive a single active signal stream from an HPA at one of its two input ports. For example, only one of the HPAs 204a or 208a may be actively transmitting an amplified signal to matrix 212a, such that the hybrid matrix 212a receives an active signal at one of its input ports. The hybrid can forward the single signal stream to one of the two feeds (e.g., 214a or 214b) (if unpaired), or split the signal stream between both the feeds at its two output ports (if paired). The structure of a 2×2 hybrid pairing matrix is described in greater detail in the following sections.

Other configurations of hybrid matrices are also possible. For example, a hybrid matrix may be a 3×3 hybrid pairing matrix, 4×4 hybrid pairing matrix, or some other suitable configuration. In some implementations, the output section 200A may include 4×4 hybrid pairing matrices. This may be the case, for example, when 4×16 switching matrices are used. A 4×4 hybrid pairing matrix includes four input ports and four output ports. A 4×4 hybrid pairing matrix can receive signal streams from one to four different HPAs at its four input ports, and forward the received signal stream(s) to between one to four feeds connected to its four output ports.

In some implementations, the satellite output section 200A may not include the pairing circuitry. In such implementations, the hybrid matrices 212a-212h are not present in the output section 200A. Each HPA is directly coupled, through the switching matrices, to the feeds. For example, HPA 204a may be connected to two feeds 214a and 214i via two switches in the switching matrix 206. Accordingly, the amplified signal output by HPA 204a may be routed to either feed 214a or feed 214e for beamforming. Similarly, other HPAs may be connected to two or more feeds through respective switching matrices. In the configuration shown with 8 HPAs and 16 feeds, each HPA may be connected to two feeds through two switches. The amplified signal from each HPA would be directly fed to one of the two connected feeds by routing through the switches.

In some implementations, the satellite output section 200A may not include the switching circuitry. In such implementations, the switching matrices 206 and 210 are not present in the output section 200A. Instead, each HPA is directly coupled to a hybrid matrix. For example, HPA 204a may be connected to hybrid matrix 212a. Accordingly, the amplified signal output by HPA 204a may be sent to only either (if unpaired) or both (if paired) feeds 214a and 214b for beamforming. Another HPA may be connected to the second input port of the hybrid matrix 212a, thereby allowing the feeds 214a and/or 214b to be energized by a second distinct beamforming signal. Alternatively, the second input port of matrix 212a may not be connected to another HPA, such that the feeds 214a and/or 214b may be energized only by the HPA 204a signal. Similarly, other HPAs may be directly connected to other hybrid matrices, with no switching of an HPA signal between two or more hybrid matrices.

Returning to the configuration 200A of FIG. 2A, each switching matrix is uniquely connected to a set of HPAs at its input. For example, switching matrix 206 is connected to the first set of HPAs 204a-204d, while switching matrix 210 is connected to the second set of HPAs 208a-208d. A set of HPAs and its associated switching matrix may be referred to as a ring. Accordingly, HPAs 204a-204d and switching matrix 206 form a first ring, while HPAs 208a-208d and switching matrix 210 form a second ring.

In some implementations, the output section 200A includes more rings, hybrid matrices and feeds than that shown in FIG. 2A. For example, the satellite 105 may include 96 feeds, but the beam former processor 202 may be limited to processing 48 active signals. Accordingly, 48 beams may be formed using a subset of the 96 feeds. This may be achieved with an output section 200A that includes 48 HPAs and 48 2×2 hybrid pairing matrices, with each hybrid matrix coupled to 2 feed elements. The HPAs may be grouped into rings of four each, with each ring including a 4×8 switching matrix that connects the four HPAs in the ring to eight hybrid matrices. In this configuration, the output section 200A includes 12 rings. Each 2×2 hybrid matrix is connected to two of these 12 rings, i.e., the two input ports of a hybrid matrix can receive signals from two distinct HPAs in two different rings.

The beam former processor 202 may be any suitable microprocessor that is configured for processing satellite signals and controlling the components in a satellite to form beams for signal transmission. In some implementations, the beam former processor 202 is a digital processor that is configured to convert input analog data streams into digital signals. In other implementations, the beam former processor 202 is an analog processor that processes the data streams as analog transmission.

The beam former processor 202 receives the data streams for transmission and determines which data streams are to be forwarded through which of the HPAs. For each HPA, the beam former processor looks up the feeds that the HPA can be connected to through the switching and hybrid matrices. Then the beam former processor determines which of these feeds should receive the HPA signal to form a desired downlink beam such that all targeted terrestrial regions are covered by all formed beams. The beam former processor controls the connections in the associated switching matrix to route the HPA signal to the hybrid matrix coupled to the selected feed(s).

The switching matrix routes the amplified data stream for the HPA to the appropriate hybrid matrix that is coupled to the selected feed(s). The beam former processor 202 controls the hybrid matrix to switch the signal to the selected feed at its output (if unpaired) or to both feeds (if paired), thereby sending the amplified microwave downlink power to a beam in a targeted transmission region within the coverage area of the satellite as required by the varying traffic loads.

As an example of the above-described operation of the satellite output section 200A, the HPA 204a may be connected to the hybrid matrices 212a and 212e through the switching matrix 206, and thereby the signal output by HPA 204a may be sent to feeds 214a and/or 214b coupled to matrix 212a, or to feeds 214i and/or 214j coupled to matrix 212e. Based on the coverage requirement, the beam former processor 202 may select feed 214j for the HPA 204a signal. Accordingly, the processor may control the switches in the switching matrix 206 that are connected to the HPA 204a to route the amplified signal output by HPA 204a on a switched path connected to an input port of hybrid matrix 212e. The beam former processor 202 may control the hybrid matrix 212e to switch the received HPA 204a signal such that it is sent to the feed 214i at one of its output ports.

The above is an example of the beam former processor performing switching without pairing. As an example of both switching and pairing, the beam former processor 202 may select, based on the coverage requirement, both feeds 214i and 214j for the HPA 204a signal. Accordingly, the processor may control the switches in the switching matrix 206 that are connected to the HPA 204a to route the amplified signal output by HPA 204a on a path connected to an input port of hybrid matrix 212e. The beam former processor may control the hybrid matrix 212e to share the amplified microwave downlink power of the HPA 204a signal between the feeds 214i and 214j at its output ports, by sending a portion of the HPA signal to each feed.

FIG. 2B illustrates an example output section 200B of a satellite for flexible beamforming using 4×8 switching matrices. The output section 200B is an example implementation of the output section 200A, in which low-loss switches are used in the switching matrices 206 and 210. As shown in FIG. 2B, the first set of HPAs 204a-204d are connected to switches 206a-206h, while the second set of HPAs 208a-208d are connected to switches 210a-210h. In some implementations, the switches 206a-206h and/or the switches 210a-210h are low-loss waveguide "R" switches. In some other implementations, the switches 206a-206h and/or the switches 210a-210h are some other suitable low-loss switches. For example, the switches 206a-206h and/or the switches 210a-210h can be "S" switches, where an "S" switch is configured to switch one input onto one of two output lines, or switch one of two input lines onto an output line.

The first set of HPAs 204a-204d connected to switches 206a-206h forms a first ring of the satellite output section, while the second set of HPAs 208a-208d connected to switches 210a-210h forms a second ring of the satellite output section. As shown, in each ring the switches are configured in a single line in some implementations, with an HPA output connected to a switch input for every alternate switch. The input of every other alternating switch is connected to the preceding switch, forming a pair. For example, the input of switch 206a is connected to the output of HPA 204a, while the input of switch 206b is connected to switch 206a, forming a pair. Similarly, switches 206c and 206d form another pair, with the input of switch 206c receiving the HPA 204b output. This configuration creates a total number of N-M stages in an M×N switching matrix. In the present example, M=4 and N=8. However, as discussed previously, other configurations are also possible, e.g., with M=6, 8, 16, or 32, among others, and N=12, 16, or 24, among others.

Other configurations of the switches in a switching matrix are also possible. For example, in some implementations, a set of "R" switches may be connected in a thinned "FFT" pattern. This configuration has the property that the four input HPAs may connect to any pattern of 4 out of 8 array feeds (via intermediate hybrid matrices, if present) while passing through no more than 3 switches. In this case, $[(N/2)*\log_2(N/2)+2]$ switches are used. Accordingly, for N=8 (i.e., 8 output feeds for a switching matrix), the number of switches is 10. For this example, adding another switch will allow the addition of two additional (redundant/spare) amplifiers.

The output of each switch is connected to feeds through hybrid matrices. For example, as shown, the output of switch 206a is connected to feeds 214a and 214b through the hybrid matrix 212a, while the output of switch 206b is connected to feeds 214c and 214d through the hybrid matrix 212b.

As described previously, in some implementations the hybrid matrices are not present. In such implementations, the output of each switch is directly connected to a single feed. For example, the output of switch 206a may be connected to feed 214a, while the output of switch 206b may be connected to feed 214c.

In the example satellite output section 200B, the signal from HPA 204a may be sent to feeds 214a and/or 214b by routing the signal through switch 206a to hybrid matrix 212a. Alternatively, the signal from HPA 204a may be sent to feeds 214c and/or 214d by routing the signal through switches 206a and 206b to hybrid matrix 212b. Alternatively, the signal from HPA 204a may be sent to feeds 214o and/or 214p by routing the signal through switches 206a and 206h to hybrid matrix 212h. In this manner, the four HPAs 204a-204d in the first ring may connect to any pattern of 4 out of the 8 hybrid matrices, and thereby to 4 (if unpaired) or 8 (if paired) feeds out of 16 that are coupled to the hybrid matrices. Accordingly, the signals from the HPAs 204a-204d can be used to form 4 beams (using either unpaired or paired feeds) by passing the signals through 1 switch for the initial configuration, and no more than 3 switches for any configuration of feeds.

When an HPA signal is switched to one of a number of feeds using the switching matrix as described above, a signal may not be sent to the unselected feeds. For example, as described above, the HPA 204a may be connected to feeds 214a and/or 214b through hybrid matrix 212a, and to feeds 214c and/or 214d through hybrid matrix 212b. Feed 214c may be selected and the HPA 204a signal may be routed to feed 214c through switches 206a and 206b, and through hybrid matrix 212b. Other HPAs may send their corresponding signals to a subset of the feeds 214e-214p. In this case, no amplified HPA signal may be sent to the feeds 214a or 214b (and possibly also to feed 214d). In this situation, the feeds 214 and 214b are effectively turned off, thereby preventing the feeds 214a and 214b from forming beams. This is in contrast to traditional satellite output sections, where every feed is energized, i.e., a signal is always sent to a feed from the output of an HPA connected to the feed. In such cases, beamforming by a feed may be prevented by setting the corresponding beamforming coefficients to values such that the power and gain of the formed beam is below acceptable thresholds. However, the feeds are not turned off by not sending signals to these feeds in the traditional satellite configuration, unlike that may be achieved using the flexible beamforming satellite output section 200A, 200B or 200C.

In some implementations, for a satellite that uses hybrid pairing matrices in its output section as shown in the example configurations above, the feeds can be manufactured in pairs with the hybrid pairing matrices built in to the output section. This may be done, for example, to minimize recurring costs.

FIG. 2C illustrates an example output section 200C of a satellite for flexible beamforming using 4×8 switching matrices and a spare HPA to form a ⅖ sparing. The output section 200C is an example implementation of the output section 200A, in which low-loss waveguide "R" switches are used in the switching matrices 206 and 210. FIG. 2C shows the first set of HPAs 204a-204d connected to switches 206a-206h. Similarly, other sets of HPAs are connected to other switches, e.g., the second set of HPAs 208a-208d connected to switches 210a-210h, as described in the output section 200B. The output section 200C also includes HPA 216, which forms a spare HPA that is connected to the first ring of HPAs 204a-204d, and to a second ring of HPAs (e.g., 208a-208d as described previously).

In some implementations, an active HPA in a ring may fail during operation of the satellite output section. In such cases, the spare HPA connected to the particular ring with the failing HPA is employed to forward the signal that would otherwise have been forwarded by the failing HPA. For example, if HPA 204a in the first ring fails, then the spare HPA 216 is activated to amplify the signal that was previously intended for HPA 204a.

As shown, the spare HPA 216 is connected to the switching matrix 206 (e.g., through the switch 206b) in the first ring, and to the switching matrix in the next ring (e.g., ring comprising HPAs 208a-208d and switching matrix 210)

using a switch 218. The switch 218 may be a low-loss "R" switch, or it may be some other suitable switch configuration.

If an HPA in the first ring fails, then the corresponding amplified signal is output by the spare HPA 216 and sent to the switching matrix 206 by routing through switch 218, and then onward to the intended feed element(s) through the corresponding hybrid matrix, as described previously with respect to the output section 200B. Similarly, if an HPA in the second ring fails, then the corresponding amplified signal is output by the spare HPA 216 and sent to the switching matrix in the next ring by routing through switch 218. Accordingly, the spare HPA 216 forms a backup to address situations where an active HPA in one of the ring(s) to which the spare HPA is connected, fails.

The group of spare HPAs and associated switches (e.g., HPA 216 and switch 218) together form a redundancy ring. Using the switching circuitry of the present configuration, the redundancy or sparing can be achieved by adding one more switch corresponding to each spare HPA, in addition to the switches included in the switching matrices. Accordingly, the addition of the redundancy ring to the switching circuitry may not increase the complexity of the satellite output section, or the weight of the satellite, by a considerable amount.

In traditional satellite output sections that do not use the switching circuitry disclosed here, sparing is achieved by including one sparing switch for every HPA. For example, in a traditional satellite, there will be five sparing switches for four active HPAs and one spare HPA. In contrast, in a flexible beamforming satellite with 4×8 switching matrix as described with reference to configurations 200B or 200C, there will be eight switches in a ring for four active HPAs and an additional switch for one spare HPA connected to the ring, i.e., a total of nine switches, which is four more than in a traditional configuration with the same four active HPAs.

Accordingly, adding a redundancy ring to the flexible beamforming output section 200B or 200C may increase the total number of switches compared to a traditional solution, thereby leading to an increase in the weight or circuit complexity of the satellite. However, this increase in weight or circuit complexity of the satellite may be offset by the reduction in the number of HPAs that are onboard the satellite for beamforming for a given number of feeds. For example, a traditional satellite with 96 feeds will include 96 HPAs for beamforming. The flexible beamforming satellites as described herein, in contrast, may use only 48 HPAs for beamforming with 96 feeds. Therefore, the overall weight or circuit complexity of the satellite may be limited, even though the addition of the switching circuitry may increase the number of switches used, and the addition of the hybrid pairing circuitry may further increase the system components.

As detailed above with respect to FIGS. 2A-2B, a beam former processor (e.g., 202) can connect a large number of array feeds (e.g., 214a-214p) to a smaller number of HPAs (e.g., 204a-204d and/or 208a-208d) by means of a command-able low-loss switch network (e.g., switching matrices 206 and/or 210), allowing different beam patterns to be formed as different subsets of the array feeds are energized. In this manner, a small number of HPAs may be employed in a satellite output section to successively form different coverage beams over the much wider field of view of the spacecraft antenna. Accordingly, high gain may be achieved in the targeted terrestrial regions where the beams are directed, while other coverage areas with lower priority may have lower gain. Non-targeted terrestrial regions may have zero gain as the feeds covering these regions may not be energized to form beams. However, in some implementations, ubiquitous coverage in all the terrestrial regions may be achieved, e.g., by energizing all feeds in paired configurations to form beams with a lesser number of HPAs. The successive beamforming may be done dynamically in orbit by the beam former processor.

The output section configurations 200A, 200B or 200C may be generalized to allow M amplifiers to be connected to any pattern of M out of the N feed elements by continuing their connection patterns with additional switches to match the additional input HPAs and array feeds. In some implementations, the number of feeds and HPA inputs may be expanded by placing two networks in parallel (e.g., the output section 200B or 200C), and then connecting their corresponding output lines with a set of either hybrids or switches (e.g., "R" switches) to either share or switch the power respectively between the paired output feeds.

As an example implementation of a satellite output section for flexible beamforming as described above with respect to FIGS. 2A-2C, a satellite may include 96 feeds, which may be used to form 48 beams fed by 48 HPA signals. The 48 signals are routed to the feeds using 96 switches in a 4×8 switching matrix configuration, thereby forming 12 rings, with each ring including 4 HPAs and 8 switches. There are no redundancy HPAs included. The beam former processor may be a 25 GHz processor or 50 GHz, and the beams may be formed with single or double polarization.

Figure 3:
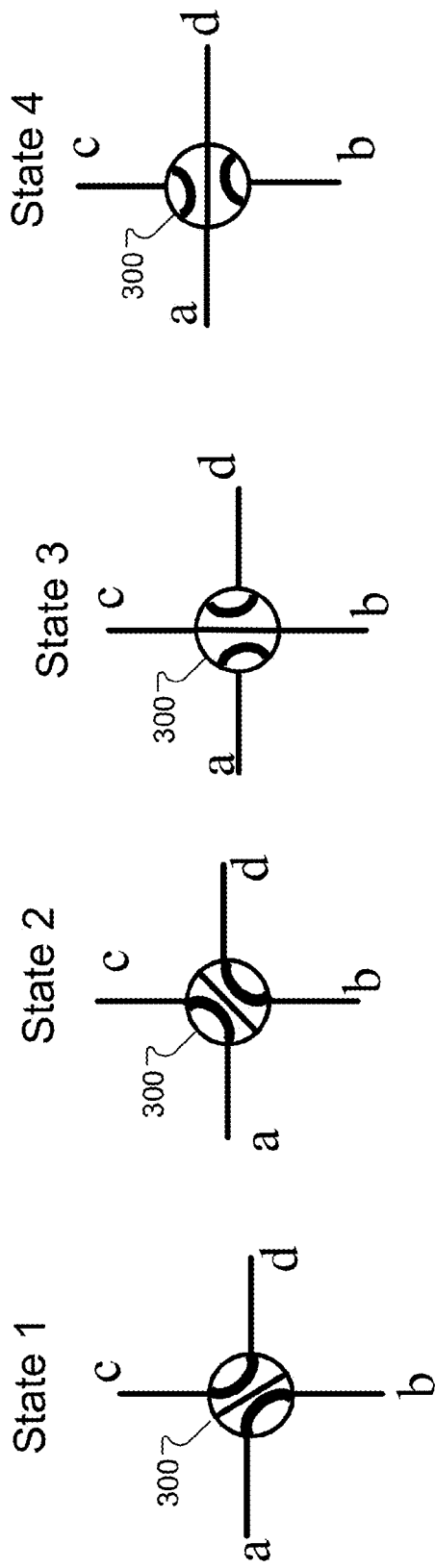
FIG. 3 shows switching states of an example "R" switch.

As described above, in some implementations the switches 206a-206h, 210a-210h, or 218 may be low-loss waveguide "R" switches, which may limit the connectivity loss for any combination to be equal to or less than 0.3 dB. FIG. 3 shows switching states of an example "R" switch 300. The switch 300 may be similar to any of switches 206a-206h, or 210a-210h.

As shown in FIG. 3, the switch 300 can be configured in one of various states. The configuration may be performed based on control signals from the beam former processor, e.g., 202. When the switch 300 is configured in state 1, the switch connects a to b, and c to d. When the switch is configured in state 2, the switch connects a to c, and b to d. When the switch is configured in state 2, the switch connects a to c, and b to d. When the switch is configured in state 3, the switch connects b to c, and when the switch is configured in state 4, the switch connects a to d.

FIGS. 4A, 4B, 4C and 4D are example configurations 400A, 400B, 400C and 400D respectively of a hybrid pairing matrix that may be used in a satellite output section for flexible beamforming by pairing feeds. The hybrid pairing matrix shown in FIGS. 4A-4D may be similar to any of the hybrid matrices 212a-212h.

The hybrid pairing matrix shown in FIGS. 4A-4D is a 2×2 hybrid pairing matrix, which includes two input ports 402a and 402b, and two output ports 404a and 404b. A signal input at port 402a is split at junction 406a into two paths, 408a and 408b. A signal input at port 402b is split at junction 406b into two paths, 410a and 410b. The signal is propagated along path 408a without any delay, while the signal along path 410a is delayed by one phase, i.e., 180 degrees. These two signals are combined at junction 412a. The split signal along paths 408b and 410b are propagated without a phase delay. These two signals are combined at junction 412b.

The combined signal output at junction 412a is split at junction 416a. The split signals are subsequently propagated along path 418a without any delay, while the signal along path 418*b* is phase shifted using a phase shifter 414. The phase shifter 414 switches a signal at its input between two states separated by 180 degrees.

The combined signal output at junction 412*b* is split at junction 416*b*. The split signals are subsequently propagated along paths 420*a* and 420*b* without any delay.

The signal along path 418*a* is combined with the signal along path 420*a* at junction 422*a*, and output at port 404*a*. The signal along path 420*b* is combined with the signal along path 418*b* at junction 422*b*, and output at port 404*b*.

The input ports 402*a* and 402*b* are connected to the outputs of HPAs and thereby receive the amplified signals output by the HPAs. For example, the hybrid matrix may be hybrid 212*a*, with the input ports 402*a* and 402*b* receiving signals output by HPAs 204*a* and 208*a* respectively. In some implementations, the coupling between the input ports 402*a* and 402*b* and the HPA outputs are through a switching matrix. For example, considering satellite output section 200B, the input port 402*a* may be coupled to HPA 204*a* output through the switch 206*a* in switching matrix 206, while the input port 402*b* may be coupled to HPA 208*a* output through the switch 210*a* in switching matrix 210. This may be the case, for example, in a satellite configuration that includes both a pairing circuitry and a switching circuitry. However, in some other implementations, the coupling between the input ports 402*a* and 402*b* and the HPA outputs are direct. For example, the input port 402*a* may be coupled to HPA 204*a* output directly without going through a switching matrix, while the input port 402*b* may be coupled to HPA 208*a* directly without going through a switching matrix. This may be the case, for example, in a satellite configuration that includes a pairing circuitry, but does not include a switching circuitry.

The output ports 404*a* and 404*b* are connected to feeds for transmitting the amplified signals for beamforming. For example, considering that the hybrid matrix is hybrid 212*a*, the output ports 404*a* and 404*b* may be connected to feeds 214*a* and 214*b* respectively.

Figure 4A:
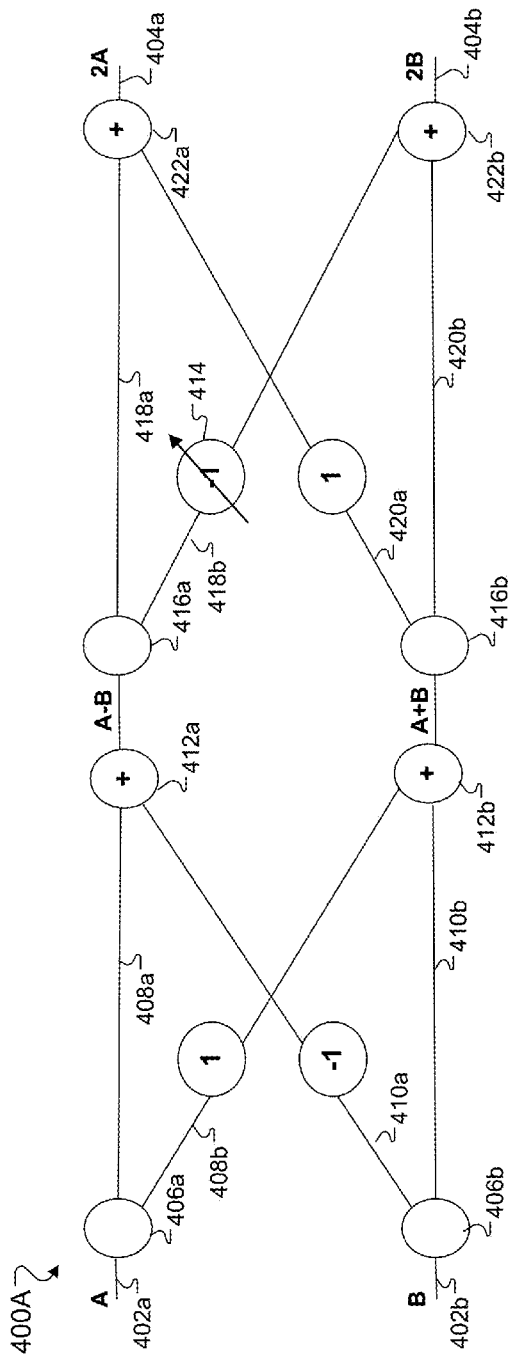
FIGS. 4A, 4B, 4C and 4D are example configurations of a hybrid pairing matrix that may be used in a satellite output section for flexible beamforming by pairing feeds.

In the example configuration 400A of FIG. 4A, the hybrid matrix receives two distinct signals, A and B, at its input ports, and outputs the two signals to the connected feeds separately through the output ports. The beam former processor, e.g., 202, preprocesses the two signals A and B, and sends one the two signals, e.g., A, through a first HPA, e.g., 204*a*, whose output is connected to the input port 402*a*. The beam former processor sends the other signal, e.g., B, through a second HPA, e.g., 208*a*, whose output is connected to the input port 402*b*.

The beam former processor controls the hybrid matrix circuitry to combine the signals into A−B at 412*a*, and into A+B at 412*b*. Subsequently the beam former processor controls the hybrid matrix to split the combined signal A−B at 416*a*, whereby A−B is sent without delay along path 418*a* towards output port 404*a* and is transmitted towards output port 404*b* using path 418*b*, with a phase shift by the phase shifter 414. In configuration 400A, the phase shifter 414 has a phase of −1, and thereby the signal A−B along path 418*b* is delayed by 180 degrees. The beam former processor controls the hybrid matrix circuitry to split the signal A+B at 416*b*, whereby A+B is sent without delay along path 420*a* towards output port 404*a* and along path 420*b* towards output port 404*b*.

The beam former processor controls the hybrid matrix circuitry to combine, at 422*a*, the signal A+B received along path 420*a* with the signal A−B received along path 418*a*. The output of 422*a* is the individual signal A, which is represented in FIG. 4A as 2A, since [A+B] (along 420*a*)+[A−B] (along 418*a*)=2A. Signal A is sent to the feed connected to output port 404*a* (e.g., feed 214*a*). Similarly, the beam former processor controls the hybrid matrix circuitry to combine, at 422*b*, the phase-shifted signal A−B received along path 418*b* and the signal A+B received along path 420*b*. The output of 422*b* is the individual signal B, which is represented in FIG. 4A as 2B, since [A+B] (along 420*b*)+[−(A−B)] (along 418*b*)=2B. Signal B is sent to the feed connected to output port 404*b* (e.g., feed 214*b*).

In some implementations, the total signal power output by the hybrid pairing matrix is same as the total signal power received at the input of the matrix. The dimensions added to the matrix output (e.g., "2"A or "2"B) do not carry any particular significance, apart from being artifacts of the circuitry computation shown in FIG. 2A. However, in some implementations, the hybrid pairing matrix may be a multiport amplifier. In such cases, the signal power output by the matrix may be amplified, i.e., greater than the signal power received at the input of the matrix.

Figure 4B:
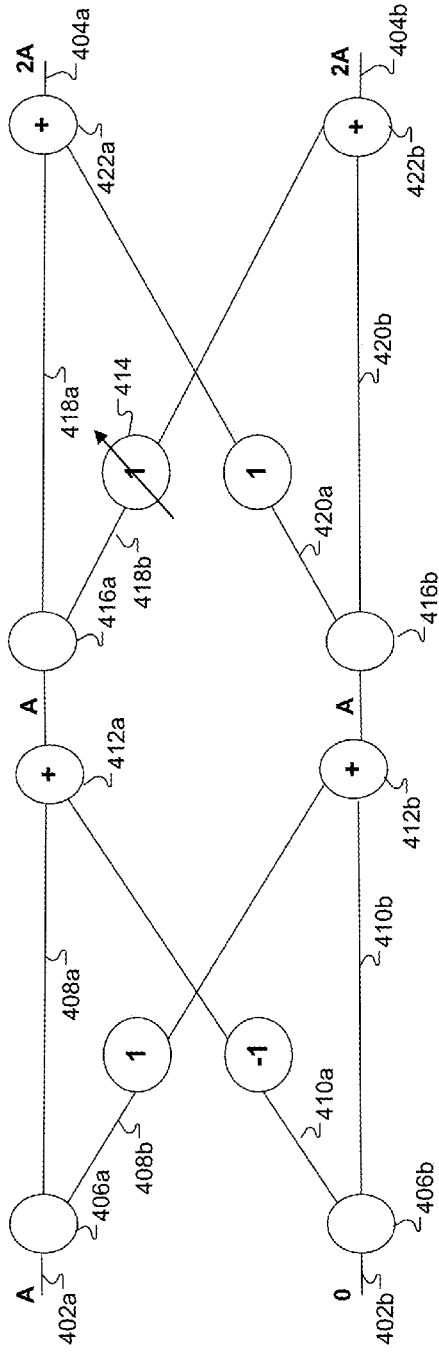

The hybrid pairing matrix configuration 400A illustrates an example where distinct signals received at the matrix input ports are output as distinct signals using unpaired feeds. The configuration 400B in FIG. 4B illustrates an example in which one signal is received at an input port of the hybrid pairing matrix, and this signal is output to both feeds connected to the matrix output by pairing.

In the example configuration 400B, the hybrid matrix receives a signal A at one of its input ports, e.g., 402*a*, while no signal is received at the other input port, e.g., 402*b*. The beam former processor, e.g., 202, sends the signal A through a first HPA, e.g., 204*a*, whose output is connected to the input port 402*a*. The beam former processor does not send any HPA output to the input port 402*b* by routing through the switching circuitry.

The beam former processor controls the hybrid matrix circuitry to split the input signal A at 406*a*, whereby A is sent along path 408*a* towards junction 412*a* and along path 408*b* towards junction 412*b*. Since there is no signal at the input port 402*b*, the signal at the output of either junction 412*a* or 412*b* is A.

The beam former processor further controls the hybrid matrix to split the signal A at 416*a*, whereby A is sent without any phase shift along path 418*a* towards output port 404*a* and along path 418*b* towards output port 404*b* using path 418*b*, phase shifted by the phase shifter 414. In configuration 400B, the phase shifter 414 has a phase of 1, and thereby the signal A along path 418*b* is not shifted in phase. The beam former processor controls the hybrid matrix circuitry to split the signal A at 416*b*, whereby A is sent without delay along path 420*a* towards output port 404*a* and along path 420*b* towards output port 404*b*.

The beam former processor controls the hybrid matrix circuitry to combine, at 422*a*, the signal A received along path 418*a* with the signal A received along path 420*a*. The output of 422*a* is the individual signal A, which is represented in FIG. 4B as 2A, since A (along 418*a*)+A (along 420*a*)=2A. Signal A at 422*a* is sent to the feed connected to output port 404*a* (e.g., feed 214*a*). Similarly, the beam former processor controls the hybrid matrix circuitry to combine, at 422*b*, the signal A received along path 418*b* and the signal A received along path 420*b*. Accordingly, the output of 422*b* is also the signal A, which is represented in as 2A, since A (along 420*b*)+A (along 418*b*)=2A. Signal A at 422*b* is sent to the feed connected to output port 404*b* (e.g., feed 214*b*). In this manner, the hybrid matrix can pair the feeds connected to its output ports and send an individual signal A received at one of its input ports to the paired feeds.

Since both output feeds use the same signal (i.e., same beamforming coefficients), the beams formed by the two feeds are identical in phase and gain, but covering different terrestrial regions (potentially with some overlap). In some implementations, the total power associated with the input signal A is split between the two output feeds, such that the power of each formed beam is less than would have been the case if a single output feed was used to form a single beam. However, in areas where the two formed beams overlap, the power may be more due to summation of the signals having the same phase and gain characteristics. In some other implementations, in situations where the hybrid pairing matrix is a multiport amplifier, the signal power output by the matrix may be amplified, and therefore the power of each beam formed using paired elements may approximate the case if a single output feed was used to form a single beam.

FIG. 4B shows pairing using two feeds, since the example hybrid matrix configuration 400B is that of a 2×2 hybrid pairing matrix. However, in other implementations, more than two feeds may be paired. For example, when the hybrid matrix is a 4×4 hybrid matrix, up to 4 feeds connected to the output ports of the matrix may be combined to share an input signal. Other configurations are also possible, such as a 3×3 hybrid matrix used to combine 3 feeds connected to the output ports to share one HPA signal.

Figure 4C:
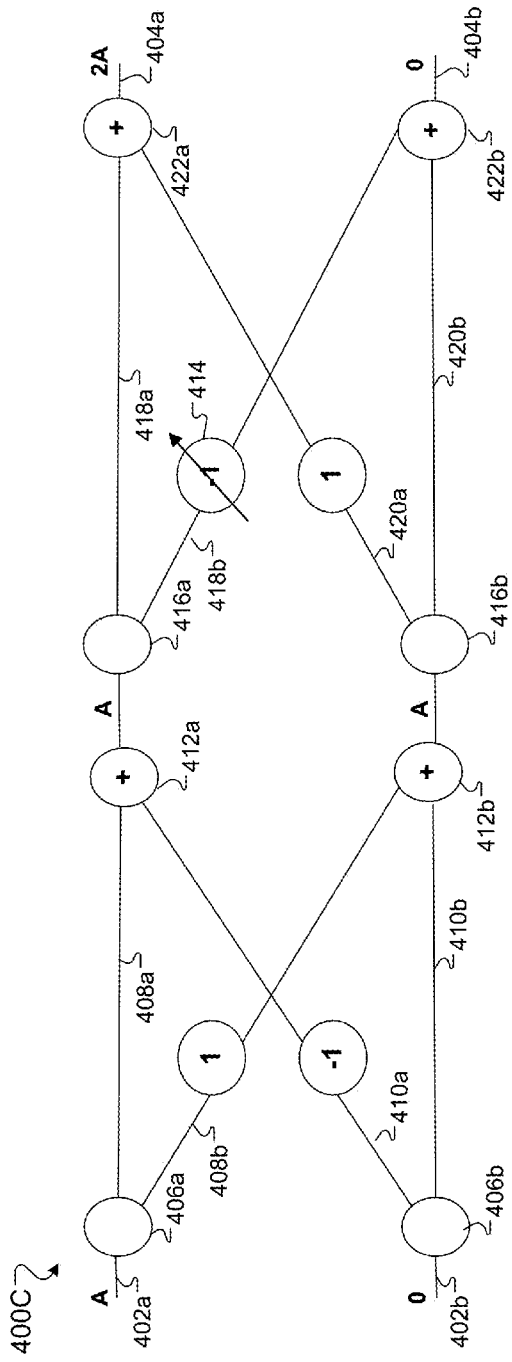
Figure 4D:
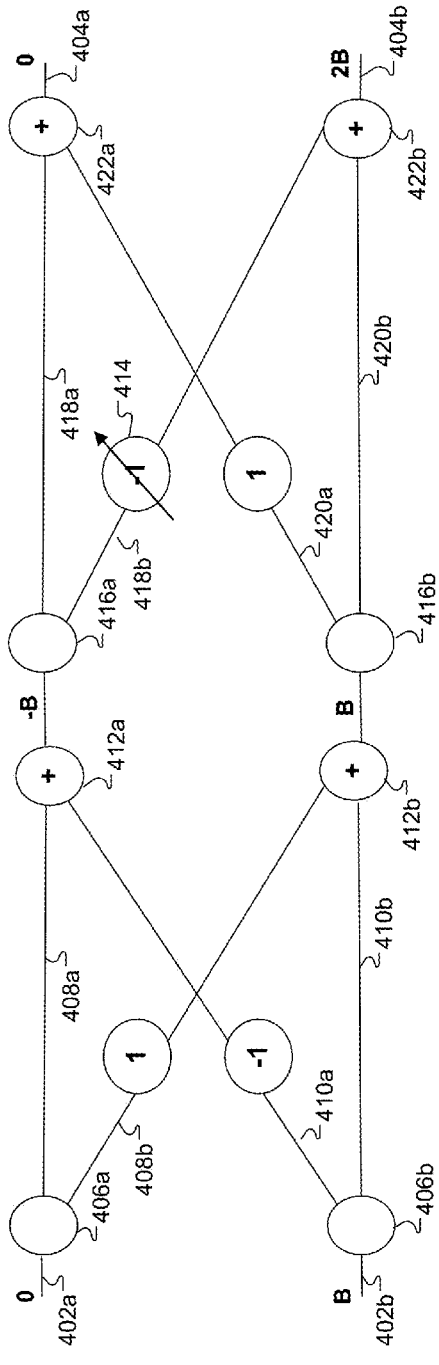

The configuration 400C in FIG. 4C or the example configuration 400D in FIG. 4D illustrate examples in which one signal is received at an input port of the hybrid matrix, and this signal is output to one of the feeds connected to the matrix output without pairing the feeds.

In the example configuration 400C, the hybrid matrix receives a signal A at input port 402a, while no signal is received at the other input port 402b. The beam former processor controls the hybrid matrix circuitry to split the input signal A at 406a, whereby A is sent along path 408a towards junction 412a and along path 408b towards junction 412b. Since there is no signal at the input port 402b, the signal at the output of either junction 412a or 412b is A.

The beam former processor further controls the hybrid matrix to split the signal A at 416a, whereby A is sent without any phase shift along path 418a towards output port 404a and along path 418b towards output port 404b using path 418b, phase shifted by the phase shifter 414. In configuration 400C, the phase shifter 414 has a phase of −1, and thereby the signal A along path 418b is shifted in phase by 180 degrees. The beam former processor controls the hybrid matrix circuitry to split the signal A at 416b, whereby A is sent without delay along path 420a towards output port 404a and along path 420b towards output port 404b.

The beam former processor controls the hybrid matrix circuitry to combine, at 422a, the signal A received along path 418a with the signal A received along path 420a. The output of 422a is the individual signal A, which is represented in FIG. 4C as 2A, since A (along 418a)+A (along 420a)=2A. Signal A at 422a is sent to the feed connected to output port 404a (e.g., feed 214a).

The beam former processor controls the hybrid matrix circuitry to combine, at 422b, the signal A received along path 420b with signal A received along path 418b, which is shifted in phase by 180 degrees compared to the path 420b signal. Accordingly, at 422b the two signals cancel each other since A (along 420b)+[−A] (along 418b)=0. Therefore, there is no signal to be sent to the feed connected to output port 404b (e.g., feed 214b). In this manner, the hybrid matrix can route an individual signal received at one of its input ports to an individual feed connected to one of it output ports without pairing, while feeds connected to the other output ports are not energized.

The example configuration 400D of FIG. 4D is largely similar to the example configuration 400C, except that in 400D the hybrid matrix does not receive any signal at input port 402a, but receives a signal B at input port 402b. The beam former processor controls the hybrid matrix circuitry to split the input signal B at 406b, whereby B is sent along path 410a towards junction 412a with a 180-degree phase shift, and along path 410b towards junction 412b. Since there is no signal at the input port 402a, the signal at the output of junction 412a is B with a 180-degree phase shift (represented as "−B"), and at the output of 412b is B without any phase shift.

The beam former processor further controls the hybrid matrix to split the signal −B at 416a, whereby the signal is sent without any further phase shift along path 418a towards output port 404a. The signal is also sent along path 418b towards output port 404b using path 418b, phase shifted by the phase shifter 414. In configuration 400D, the phase shifter 414 has a phase of −1, and thereby the signal B along path 418b is again shifted in phase by 180 degrees. The beam former processor controls the hybrid matrix circuitry to split the signal B at 416b, whereby B is sent without delay along path 420a towards output port 404a and along path 420b towards output port 404b.

The beam former processor controls the hybrid matrix circuitry to combine, at 422a, the signal B received along path 420a with signal B received along path 418a, where the latter is shifted in phase by 180 degrees compared to the former. Accordingly, at 422a the two signals cancel each other since B (along 420a)+[−B] (along 418ba=0. Therefore, there is no signal to be sent to the feed connected to output port 404a (e.g., feed 214a).

The beam former processor controls the hybrid matrix circuitry to combine, at 422b, the signal B received along path 420b with the signal B received along path 418a. Since the latter is shifted in phase by 180 degrees twice, it is in phase with the former. The output of 422b therefore is the signal B, which is represented in FIG. 4D as 2B, since B (along 420b)+[−(−B)] (along 418b)=2B. Signal B at 422b is sent to the feed connected to output port 404b (e.g., feed 214b).

Figure 5B:
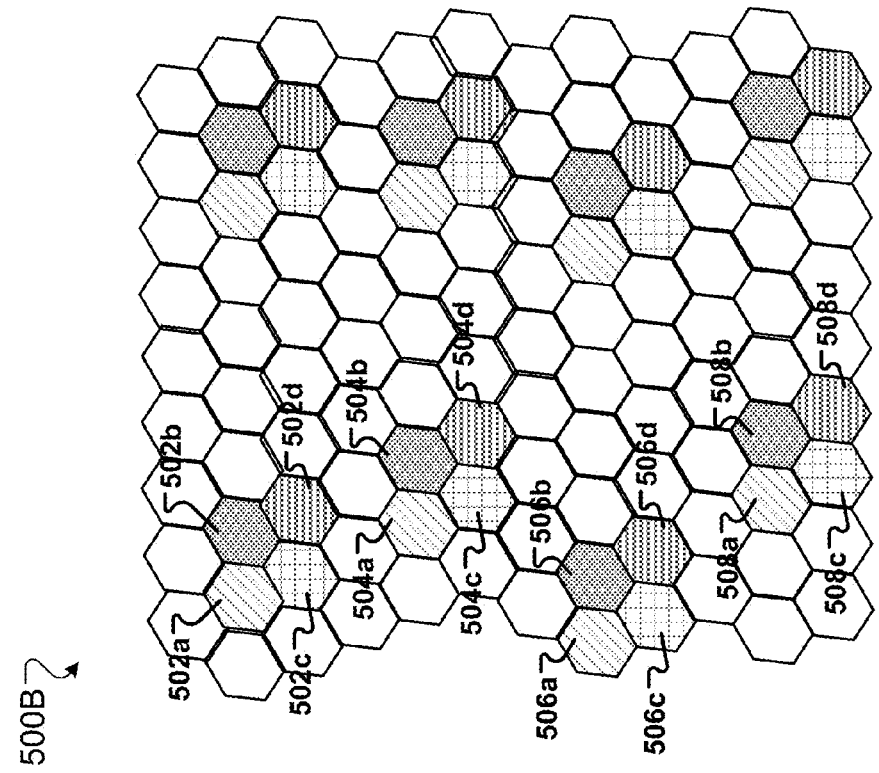
FIGS. 5A and 5B illustrate example beam coverage areas that may be achieved by flexible beamforming.
Figure 5A:
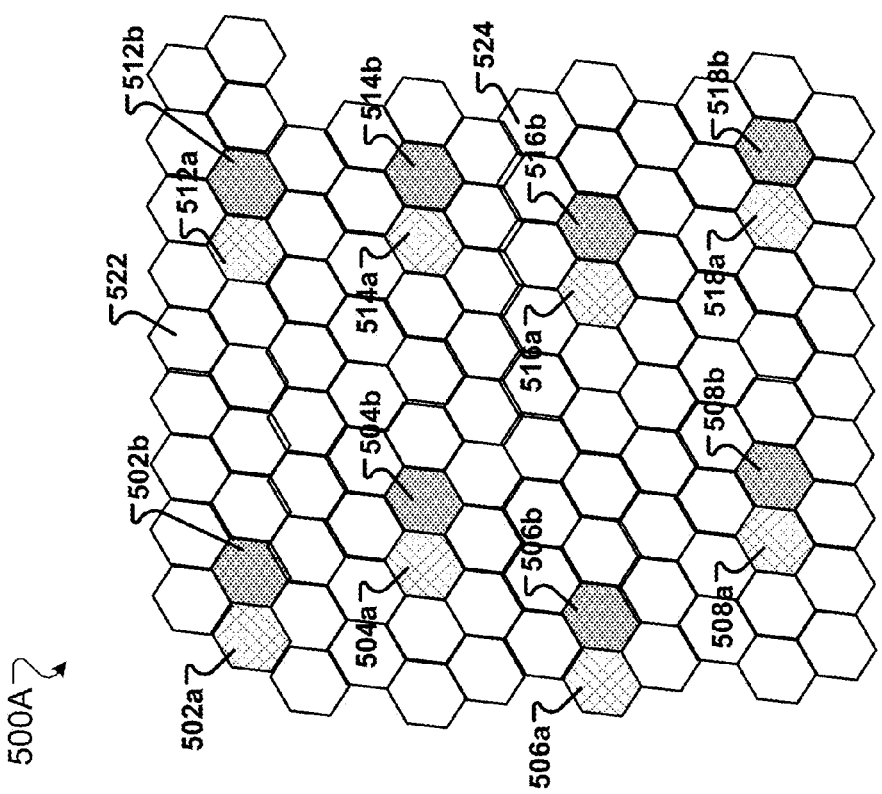

FIGS. 5A and 5B illustrate example beam coverage areas 500A and 500B respectively that may be achieved by flexible beamforming. The beam coverage area 500A includes multiple polygonal areas, e.g., 502a, 502b, 504a, 504b, 506a, 506b, 508a, 508b, 512a, 512b, 514a, 514b, 516a, 516b, 518a, 518b, 522 and 524, among others. Each polygonal area represents a terrestrial region covered by a formed beam. Accordingly, each polygonal area may be considered as representing a formed beam.

The coverage area 500A may be achieved using a satellite output section that uses 4×8 switching matrices. 502a, 502b, 504a, 504b, 506a, 506b, 508a and 508b correspond to a group of beams that may be formed using a first set of feeds that are connected to a first ring and a second ring of HPAs. For example, these may be beams formed by feeds 214a-214p shown in satellite output section 200A-200C. Similarly, 512a, 512b, 514a, 514b, 516a, 516b, 518a and 518b correspond to another group of beams that may be formed using a second set of feeds that are connected to a third ring and a fourth ring of HPAs.

502a, 504a, 506a and 508a represent beams formed by a first ring of HPAs, while 502b, 504b, 506b and 508b represent beams formed by a second ring of HPAs. For example, 502*a*, 504*a*, 506*a* and 508*a* may be beams formed by the ring of HPAs 204*a*-204*d* that are connected to feeds 214*a*-214*p* using the switching matrix 206 in satellite output section 200B. 502*b*, 504*b*, 506*b* and 508*b* may be beams formed by the ring of HPAs 208*a*-208*d* that are connected to feeds 214*a*-214*p* using the switching matrix 210 in satellite output section 200B.

Each pair of beams that are adjacent to each other, e.g., 502*a* and 502*b*, 504*a* and 504*b*, 506*a* and 506*b*, or 508*a* and 508*b* are formed using adjacent feeds connected to the same hybrid matrix. For example, beams 502*a* and 502*b* may be formed by feeds 214*a* and 214*b* that are connected to hybrid matrix 212*a*; beams 504*a* and 504*b* may be formed by feeds 214*c* and 214*d* that are connected to hybrid matrix 212*b*; beams 506*a* and 506*b* may be formed by feeds 214*e* and 214*f* that are connected to hybrid matrix 212*c*; and beams 508*a* and 508*b* may be formed by feeds 214*g* and 214*h* that are connected to hybrid matrix 212*d*.

In each group of beams, e.g., 502*a*, 502*b*, 504*a*, 504*b*, 506*a*, 506*b*, 508*a* and 508*b*, at a time the beams formed by signals from the same ring of HPAs may be active. For example, if 502*a*, 504*a*, 506*a* and 508*a* represent beams formed by a first ring of HPAs and 502*b*, 504*b*, 506*b* and 508*b* represent beams formed by a second ring of HPAs, then 502*a*, 504*a*, 506*a* and 508*a* may be active at a first time that alternates with a time when 502*b*, 504*b*, 506*b* and 508*b* may be active. This may be the case, for example, when the hybrid matrices connected to the feeds receive distinct signals from the different rings of HPAs at its input ports. For example, 504*a* may be formed by feed 214*a* using HPA 204*a* signal, while 504*b* may be formed by adjacent feed 214*b* using HPA 208*a* signal. As described previously, the beam former processor 202 may control the switching matrices 206 and 210 to switch the outputs of HPAs 204*a* and 208*a* to the two input ports of hybrid matrix 212*a*. The beam former processor may further control the hybrid matrix 212*a* such that at a time either the HPA 204*a* signal is send to the feed 214*a*, or the HPA 208*a* signal is sent to the feed 214*b*. Accordingly, the beams formed by adjacent feeds may be independently controlled.

The above may be the case when adjacent feeds connected to a same hybrid matrix are energized by distinct signals without pairing by the matrix. However, as noted previously, in some implementations the beam former processor may control the hybrid matrix to combine or pair the feeds and send the same signal to both the feeds, such that the adjacent feeds are controlled as a single phased element. In such implementations, the adjacent beams may have the same phase and gain. For example, the beams 504*a* and 504*b* may be formed by the same HPA signal and therefore may have the same phase and gain, but the coverage area is greater than would have been the case if a single beam (either 504*a* or 504*b*) was formed by sending the HPA signal to an unpaired feed.

In either case, whether adjacent beams are formed independently by unpaired feeds or by pairing the feeds as a single phased element, the total number of active beams (as measured by distinct beamforming coefficients) formed by a group of feeds are limited by the number of HPA signals output from the same ring of HPAs. For example, beams may be formed by a set of feeds (using either paired or unpaired feeds) at a time by signals output from the first ring of HPAs 204*a*-204*d*, or the second ring of HPAs 208*a*-208*d*, but not both. Other sets of feeds that are connected to other rings may simultaneously form beams, e.g., 512*a*, 514*a*, 516*a* and 518*a*, or 512*b*, 514*b*, 516*b* and 518*b*, using signals received from their associated rings. However, in some implementations, a group of feeds may form distinct active beams based on amplified signals output from the multiple rings of HPAs. For example, beams may be formed by a set of feeds (using either paired or unpaired feeds) at a time by signals output from the first ring of HPAs 204*a*-204*d* and by signals from the second ring of HPAs 208*a*-208*d*.

FIG. 5B illustrates coverage 500B that may be achieved using a satellite output section that uses 4×16 switching matrices. As discussed previously, in some implementations, each HPA in a ring of 4 HPAs may be connected, through 4 switches in the associated 4×16 switching matrix, to 4 different hybrid matrices. Each hybrid matrix, in turn, may receive signals from 4 HPAs at four input ports, and forward the received signals through four output ports to four feeds. Accordingly, four rings of HPAs can be connected to a hybrid matrix, and a corresponding group of feeds that receive signals from the four rings can form 16 distinct beams, with four beams corresponding to signals from the same ring being active at a time.

FIG. 5B shows an example of the above configuration. 502*a*-502*d*, 504*a*-504*d*, 506*a*-506*d* and 508*a*-508*d* are beams formed by a group of feeds that receive signals from the same four rings of HPAs. 502*a*, 504*a*, 506*a* and 508*a* represent beams formed by a first ring of HPAs; 502*b*, 504*b*, 506*b* and 508*b* represent beams formed by a second ring of HPAs; 502*c*, 504*c*, 506*c* and 508*c* represent beams formed by a third ring of HPAs; and 502*d*, 504*d*, 506*d* and 508*d* represent beams formed by a fourth ring of HPAs. At a time, the beams formed by signals from any one ring of HPAs may be active. In a manner similar to that described with respect to coverage 500A, other beams formed by other groups of feeds that receive signals from other rings may be simultaneously active.

Beams that are adjacent to each other, e.g., 502*a*, 502*b*, 502*c* and 502*d*, may be formed using feeds that are connected to the same hybrid matrix. The adjacent beams can be independently controlled or combined & controlled as a single phased element. Pairs of adjacent beams can also be independently controlled or combined into 1 to 4 phased elements.

Figure 6:
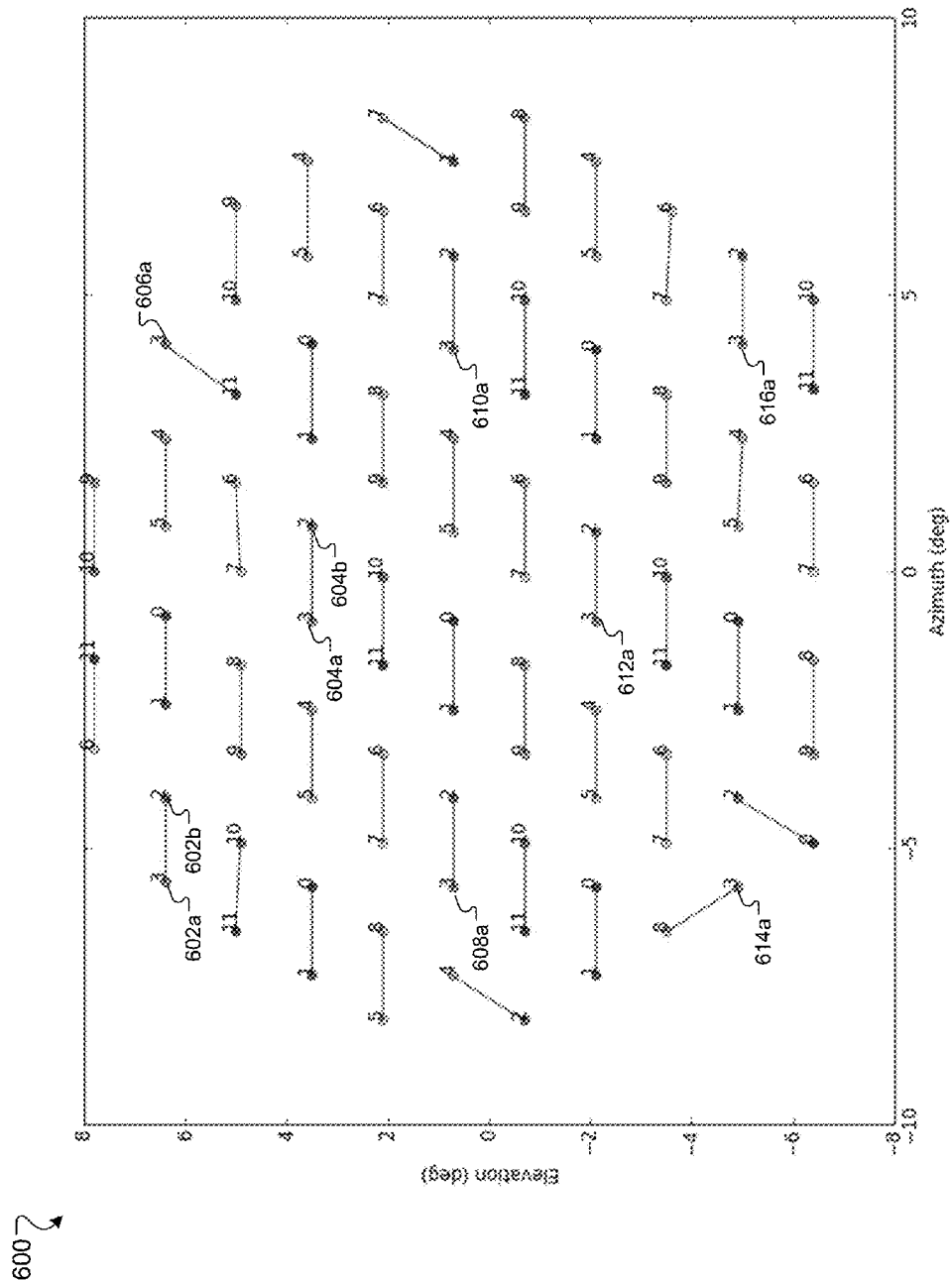
FIG. 6 illustrates an example of mapping HPA rings and feed pairings in a satellite output section for flexible beamforming.

FIG. 6 illustrates an example of mapping HPA rings and feed pairings in a satellite output section for flexible beamforming. The satellite output section may be similar to any of the satellite output section configurations 200A-200C.

Each circle in FIG. 6, such as 602*a*, 602*b*, 604*a*, 604*b*, 606*a*, 608*a*, 610*a*, 612*a* 614*a* or 616*a*, represent a feed. As shown, multiple feeds are oriented in the satellite output section based on elevation and azimuth of the feeds with respect to the terrestrial surface when the satellite is in orbit. The elevation and azimuth may be determined during the design phase of the satellite output section. During the design phase, the coverage area of each beam generated by the satellite may be determined such that all terrestrial regions targeted by the satellite are adequately covered. The elevation and azimuth of each feed may be computed according to the determined orientation of the corresponding beam generated by the feed to cover the intended terrestrial region for this beam. Subsequently, the satellite output section is constructed with each feed in the antenna element array configured depending on its azimuth and elevation.

In FIG. 6, two feeds that are connected by a straight line indicate feeds that may be paired to form a single phased element. For example, feeds 602*a* and 602*b*, or feeds 604*a* and 604*b*, may be paired. As shown, feeds that may be paired are adjacent feeds as configured in the satellite output section. This is because these feeds are connected to output ports of the same hybrid matrix. Accordingly, as shown, feeds 602a and 602b are connected to output ports of one hybrid pairing matrix, while feeds 604a and 604b are connected to output ports of another hybrid pairing matrix. For example, 602a and 602b may be similar to feeds 214a and 214b, which are connected to hybrid matrix 212a, while 604a and 604b may be similar to feeds 214g and 214h, which are connected to hybrid matrix 212d.

The numbers adjacent to each circle representing a feed in FIG. 6 correspond to an HPA ring that may provide an amplified signal to the feed. For example, feeds 602a and/or 602b, or feeds 604a and/or 604b, receive signals from HPA rings numbered 2 and 3. As described previously, this may be achieved by connecting the input ports of the hybrid matrix coupled to the feeds 602a and 602b to HPA rings 2 and 3 (through switching matrices associated with HPA rings 2 and 3, if such switching circuitry is present in the satellite output section). Similarly, the input ports of the hybrid matrix coupled to the feeds 604a and 604b are also connected to HPA rings 2 and 3.

The example in FIG. 6 includes 96 feeds that received signals from 12 HPA rings (numbered 0 to 11). Each ring is connected to feeds in eight separate hybrid matrices. For example, HPA ring 3 is connected to feeds 602a, 604a, 606a, 608a, 610a, 612a, 614a and 616a. Accordingly, the configuration shown in FIG. 6 is similar to the configurations 200A-200C in which 4×8 switching matrices are used to connect 48 HPAs to 96 feeds, which are grouped into pairs using 2×2 hybrid pairing matrices. The 48 HPAs are grouped into 12 rings, with each HPA ring including 4 HPAs and connected through its switching matrix to 8 2×2 hybrid pairing matrices.

In some implementations, the connectivity topology of different HPA rings to different feeds are also determined during the design phase of the satellite output section and subsequently hardwired in the satellite circuitry during manufacture of the output section. The connectivity topology includes the switching matrices and the hybrid pairing matrices. However, in some implementations, the connectivity topology may be reconfigurable on board the satellite, e.g., by the beam former processor.

FIG. 6 illustrates that the feeds (and the corresponding hybrid matrices) to which a ring is connected may be widely spaced apart. For example, feeds 602a, 604a, 606a, 608a, 610a, 612a, 614a and 616a (and the corresponding hybrid matrices) to which HPA ring 3 is connected are spaced apart in the satellite output section, instead of being adjacent to each other. As noted above, such connectivity of a ring to feeds is determined during the design phase. Spacing the feeds apart in this manner may be useful to increase the flexibility of beamforming by the satellite output section. For example, the distributed spacing of the feeds connected to the same ring enables the beams formed by HPA signals from the same ring to cover terrestrial regions that are widely separated, which facilitates extending the area covered by the formed beams.

FIG. 6 also illustrates that an HPA ring may share the hybrid matrices to which it is connected with more than one other HPA ring. For example, HPA ring 3 shares the hybrid matrix that is connected to feeds 602a and 602b with HPA ring 2, i.e., one input port of this hybrid matrix is fed by an HPA signal from ring 3, while the other input port of this hybrid matrix is fed by an HPA signal from ring 2. Some other hybrid matrices are similarly shared between HPA rings 2 and 3, e.g., hybrid matrices connected to feeds 604a and 604b, among others. However, in other cases ring 3 shares a hybrid matrix with an HPA ring other than ring 2. For example, ring 3 shares the hybrid matrix that is connected to feed 606a with HPA ring 11, and shares the hybrid matrix that is connected to feed 614a with HPA ring 8.

Figure 7B:
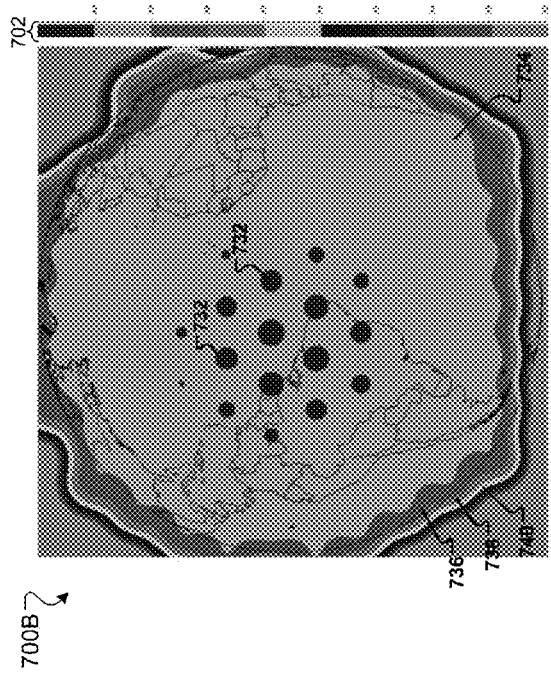
FIGS. 7A, 7B and 7C illustrate example terrestrial coverage maps that may be obtained by flexible beamforming using feed pairing.
Figure 7A:
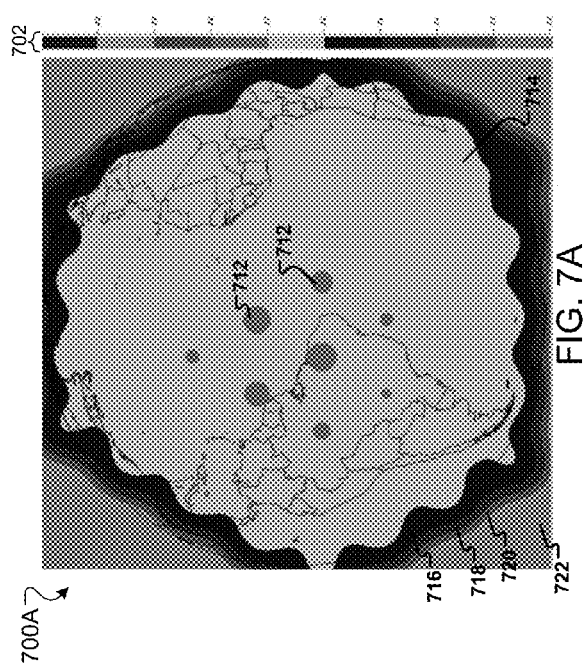
Figure 7C:
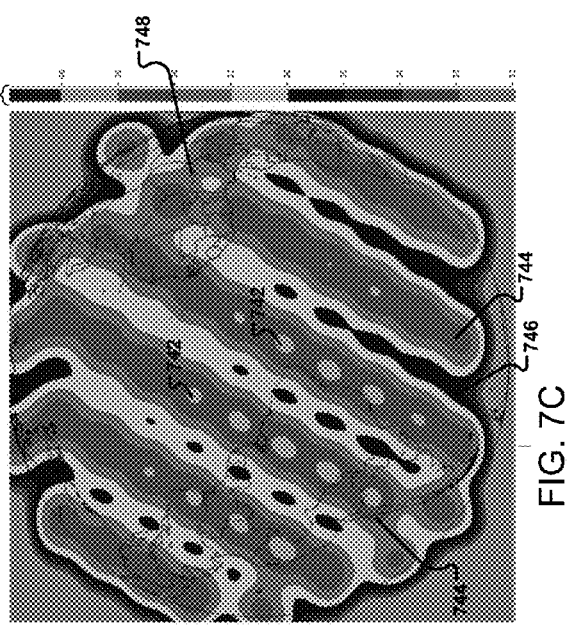

FIGS. 7A, 7B and 7C illustrate example terrestrial coverage maps 700A, 700B and 700C respectively that may be obtained by flexible beamforming using feed pairing. FIG. 7A shows coverage map 700A that may be obtained using a satellite output section with 48 feeds, where all 48 feeds are energized for forming distinct beams. The scale 702 provides a measure of the signal power in decibels (dB) that is obtained in various terrestrial regions based on the coverage provided by the beams. The coverage map 700A shows that with 48 fully energized feeds, the beams can provide coverage to most of the western hemisphere, as indicated by terrestrial regions 714, with signal power between 36-37 dB. In limited areas indicated by 712, higher signal power between 37-38 dB may be obtained. The signal power falls between 35-36 dB in the region 716, and further falls to 34-35 dB and 33-34 dB in the regions 718 and 720 respectively. Outside the planetary surface in regions indicated by 722, the signal power is further less, between 32-33 dB.

FIG. 7B shows coverage map 700B that may be obtained using a satellite output section with 96 feeds, where all feeds are energized for forming distinct beams. The coverage map 700B shows that with 96 feeds fully energized by separate active HPA signals, greater signal power may be obtained in the same terrestrial regions compared to the case with 48 feeds. For example, in some regions 732, signal power greater than 40 dB may be achieved, while in most other regions of the western hemisphere, indicated by 734, the signal power obtained is between 39-40 dB. While the signal power falls farther away from the region 734, it is still greater in these regions compared to coverage map 700A. For example, the signal power is successively 38-39 dB, 37-38 dB and 36-37 dB in regions 736, 738 and 740 respectively.

When 96 feeds are energized for handling 96 active signal streams, as in coverage map 700B, the total signal power transmitted is greater compared to the 48 feed case of 700A, and consequently the power received at any terrestrial region is greater in 700B. Handling 96 active signal streams may require a processor with enhanced processing capabilities. However, as discussed previously, the beam former processor may be limited in its processing capabilities such that it can handle a smaller number of active feeds, e.g., 48. Further, the number of HPAs in the satellite output section also may be limited, e.g., to 48. Accordingly, even if there are 96 feeds available, a smaller number of beams, e.g., 48, may be formed.

The coverage maps 700A and 700B show examples where all N available feeds in the satellite output section have been activated to form beams corresponding to M=N HPA signals (M, N being integers). In the example coverage map 700A, M=N=48, while in the example coverage map 700B, M=N=96. In contrast, FIG. 7C shows an example coverage map 700C in which all N available feeds in the satellite output section have been activated by pairing to form beams corresponding to M<N HPA signals. In 700C, N=96 and M=48, with the 96 feeds forming 48 pairs.

In 700C, every pair of feeds shares the power of an active HPA signal, and thereby the signal power obtained in particular terrestrial region may be less compared to the case in coverage map 700B, where the 96 feeds are individually energized with power of separate active HPA signals. For example, region 742 receive signal power between 39-40 dB, which is less than the signal power received in similar region 732 (i.e., over 40 dB) in the coverage map 700B. Similarly, regions 744 receive 38-39 dB power, which is less than similar region 734 (39-40 dB). As noted above, the reduction in signal power compared to 700B is because a same HPA signal is split between two paired feeds, and thereby the signal power is shared between the paired feeds, yielding lower energy in the beams created by the individual feeds. In 700B, in contrast, the entire power of an HPA signal is concentrated in one feed. Further, the total signal power of the 48 signal streams in 700C may be less than the total signal power of the 96 signal streams in 700B.

However, compared to the coverage map 700A where 48 unpaired feeds are used for 48 signal streams, the power obtained in targeted terrestrial regions in 700C by using 96 paired feeds for 48 signal streams may be greater. For example, the power obtained in terrestrial regions 742 (39-40 dB) or 744 (38-39 dB) is greater than the power obtained in any region in coverage map 700A, where the most power in any region (e.g., 712) is 37-38 dB.

At the same time, in some regions in coverage map 700C, e.g., 746, the power obtained (35-36 dB) using paired elements may be less compared to the corresponding region in coverage map 700A (e.g., 36-37 dB in 714). However, such regions may be in unpopulated areas, e.g., ocean surface, and therefore the reduction in power in these regions due to feed pairing may not be consequential. Accordingly, by pairing feeds, an increase in power may be obtained in targeted terrestrial regions with communication activity compared to using unpaired feeds for the same number of signal streams.

One artifact of using paired feeds is the change in shape of the regions covered by the paired feeds. For example, regions 712 or 732 that are covered by unpaired feeds may be circular in shape. In contrast, regions 742 that are covered by paired feeds may have a more elongated shape (e.g., approximating an ellipse) due to the overlap of adjacent beams. Further, the paired feeds also may extend the region that receives the same signal power.

Figure 8A:
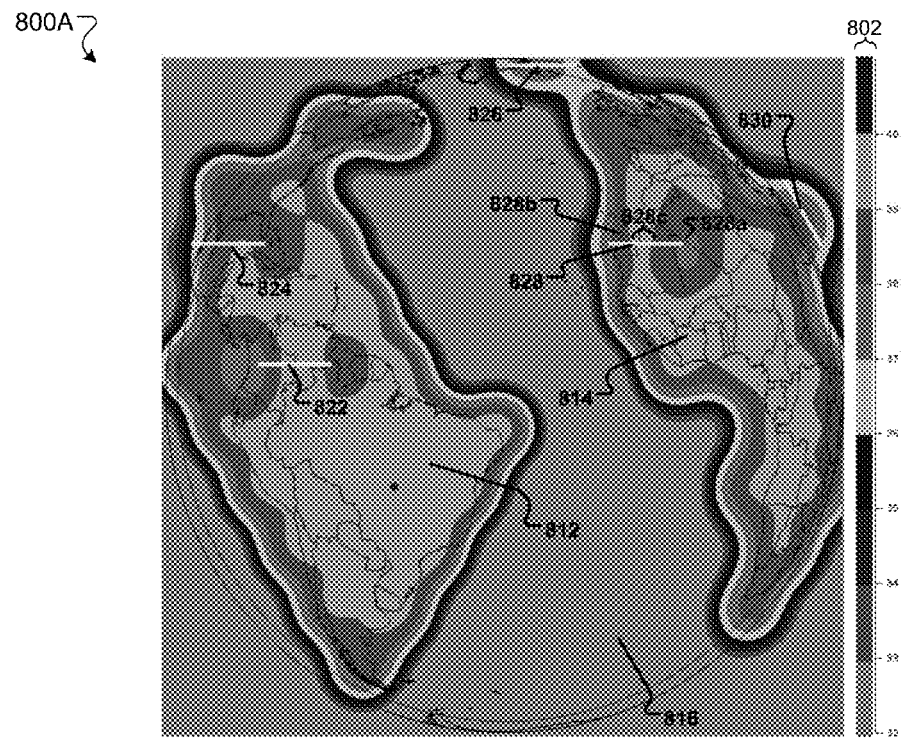
FIGS. 8A and 8B illustrate example terrestrial coverage maps that may be obtained by flexible beamforming using both switching and feed pairing.
Figure 8B:
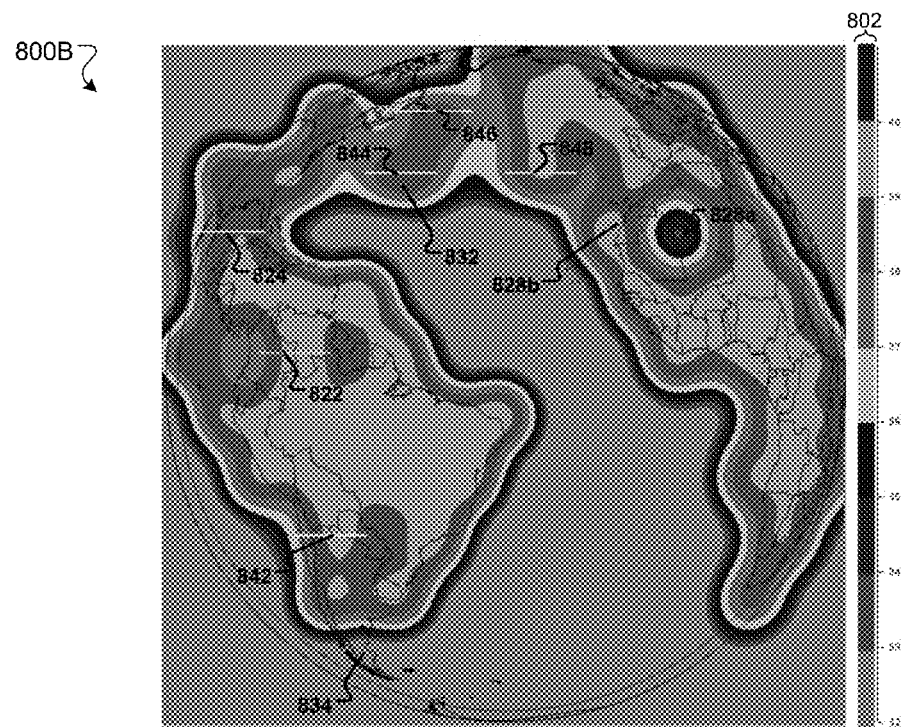

FIGS. 8A and 8B illustrate example terrestrial coverage maps 800A and 800B respectively that may be obtained by flexible beamforming using both switching and feed pairing. The coverage maps 800A or 800B may be obtained using a satellite output section in which a subset of the total number of feeds are energized to form beams using a lesser number of HPA signal streams than the number of available feeds. For example, the satellite output section may include 96 feeds and 48 HPAs, and the beam former processor can process 48 active feeds. In some implementations, the coverage maps 800A or 800B may be obtained using one of satellite output section 200A-200C.

The scale 802 provides a measure of the signal power in decibels (dB) that is obtained in various terrestrial regions based on the coverage provided by the beams. The coverage map 800A shows that a subset of N available feeds in the satellite output section has been activated to form beams corresponding to M HPA signals (M, N being integers with M<N). For example, considering the satellite output section 200A or 200B with 96 feeds and 48 HPAs (i.e., N=96 and M=48), the beam former processor 202 may control 4×8 switching matrices (e.g., 206 and 210, among others) in the satellite output section to switch the signals from the HPA rings (e.g., 204a-204d and 208a-208d, among others) to a subset of the feeds in the satellite output section (e.g., 214a-214p, among others).

The subset of feeds are selected and the switching is performed such that coverage is obtained in the terrestrial regions that correspond to landmasses, e.g., 812 and 814. The signal power obtained in the terrestrial regions 812 and 814 (e.g., 39-40 dB) approach the power obtained in these regions when all 96 feeds are energized with distinct signals, e.g., as shown in region 734 of coverage map 700B. The feeds that cover regions where the signal transmission may not be required, e.g., region 816 that covers an ocean surface, which may be largely unpopulated, are turned off by the beam former processor controlling the switching circuitry such that signals are not routed to these feeds. Accordingly, the signal power obtained in these regions (e.g., 32-33 dB) may be low.

The signal power obtained in the terrestrial regions 812 and 814 (39-40 dB) is considerably more than the power obtained in these regions when there are 48 total feeds available in the satellite output section that are energized with distinct signals, e.g., as shown in region 714 (36-37 dB) of coverage map 700A. This may be the case, for example, because the total signal power (e.g., corresponding to 48 HPA signals) is concentrated in a smaller area in coverage map 800A, in comparison to the coverage map 700A, where the same amount of signal power is distributed over a much wider area, and thereby the power obtained at any particular location is reduced.

The signal power obtained in the terrestrial regions 812 and 814 (39-40 dB) is also more than the power obtained in these regions with the same satellite output section when all N feeds (e.g. 96 feeds) are energized by pairing the feeds to transmit M (e.g., 48) distinct signals, e.g., as shown in comparable regions 744 (38-39 dB) or 748 (37-38 dB) of coverage map 700C. This may be the case, for example, for reasons similar to that above. That is, the total signal power (e.g., corresponding to 48 HPA signals) is concentrated in a smaller area in coverage map 800A, in comparison to the coverage map 700C, where the same amount of signal power is distributed over a much wider area that is covered by the 96 paired feeds, and thereby the power obtained at any particular location is reduced.

In the coverage map 800A, in addition to switching to cover selected terrestrial regions, some regions are covered by pairing the selected feeds corresponding to these regions. The pairings are indicated by the bars 822-830. As discussed previously, the beam former processor (e.g., 202) may control a hybrid matrix (e.g., 212a or 212b, among others) to pair adjacent feeds that are connected to the output ports of the hybrid matrix (e.g., 214a and 214b, or 214c and 214d).

The feeds are paired such that two beams are formed using the same input HPA signal, thereby extending the area covered by the signal to terrestrial regions where otherwise adequate coverage might not have been provided. For example, considering the pairing 828, there might have been a hole (i.e., signal power below acceptable threshold) in the region 828a without pairing, but with a requirement for providing adequate coverage. Consequently, the beam former processor pairs a feed covering region 828b with a feed covering region 828a. By pairing, the processor splits the HPA signal that was previously sent only to the feed covering region 828b, between the two feeds covering 828a and 828b. Accordingly, beams with identical coefficients are formed in the two regions, but with lower power and gain than would have been the case using one feed. The region where the beams from the paired feeds overlap, e.g., 828c, the available signal power is higher compared to the regions where the beams from the paired feeds do not overlap, e.g., 828a or 828b. The signal power is higher in the overlap region since the power that was split between the paired beams are recombined in the overlap region.

In the above manner, the beam former processor may use switching and pairing to provide adequate signal power in targeted terrestrial regions, while providing no signal in other regions. Considering the example of switching 48 signals through 96 feeds, 48 feeds would be selected without pairing. However, the coverage map 800A indicates that there are 5 pairings. Accordingly, 48−5+5*2=53 total feeds are energized, with 48−5=43 feeds being unpaired and 5*2=10 feeds being paired.

FIG. 8B shows a second coverage map 800B that is obtained by activating a subset of the N available feeds in the satellite output section to form beams corresponding to the M HPA signals (M, N being integers with M<N). The beam former processor (e.g., 202) in the satellite output section may control the switching matrices (e.g., 206 and 210, among others) and hybrid matrices (e.g., 212a-212h, among others) to dynamically change the feeds that are activated based on varying traffic demands in different terrestrial regions.

For example, there may be a requirement to provide coverage in region 832 to address air and sea routes over the North Atlantic Ocean. At the same time, there might not be much activity in region 834 in the southern tip of South America. Accordingly, the beam former processor in the satellite output section may control the switching circuitry to activates feeds covering region 832. Since the total number of feeds that can be activated to switch the fixed number (e.g., 48) of HPA signals is limited by the same number of HPA signal paths through the switching circuitry, the beam former processor may deactivate some other feed that covers a lesser priority region, when feeds covering region 832 are activated. For example, the beam former processor may control the switching circuitry such that an HPA signal is no longer routed to feeds covering region 834. In this manner, the beam former processor may dynamically control the switching circuitry to activate select feeds for flexible beamforming in regions where there is traffic demand.

In addition, or as an alternative, to updating the subset of feeds that are selected by the switching circuitry, the beam former processor may dynamically update which of these selected feeds are paired for extending coverage. The paired feeds in FIG. 8B are indicated by 822, 824 and 842-848. The pairings 822 and 824 are unchanged between the coverage maps 800A and 800B. However, the beam former processor has formed four new pairings 842-848 in 800B, but removed the pairings 828, 826 and 830 that were present in 800A.

A comparison of the regions 828a and 828b between the maps 800A and 800B illustrates how pairing may improve the coverage in some areas, while reducing coverage in some other areas. For example, regions 828a and 828b are covered by unpaired feeds in map 800B. As shown, a strong signal (39-40 dB) is provided in region 828b by an unpaired feed covering this region. However, a much weaker signal (34-35 dB) is available in region 828a, potentially because none of the active feeds adequately covers this region. In contrast, as shown in the map 800A, when the feed covering region 828b is paired (with an adjacent feed connected to the same hybrid matrix) to extend the coverage to region 828a, the available signal power in region 828a is improved (37-38 dB), since some of the signal that was previously concentrated in region 828b is now sent to region 828a. However, due to the diversion of this signal power to region 828a, the available signal power in region 828b is lower (38-39 dB) compared to the signal power in the same region in coverage map 800B (39-40 dB).

When the beam former processor updates the switching and pairing, a pairing may be broken, as noted above, when a signal is not switched to the feeds associated with the pairing. In some implementations, a decision about which feeds to select for switching, and accordingly update the pairings, may be based on determining the priorities of the transmission regions where coverage is needed. For example, a transmission region that can be adequately covered only by pairing feeds (e.g., region 828b) may be lower priority compared to other regions where coverage is needed. Accordingly, when the selected subset of feeds are updated, some feeds that were covering these low-priority regions by pairing may be deselected, such that the switching circuitry may route the signals to feeds covering higher-priority regions.

When the beam former processor updates the switching and/or the pairing, the number of feeds that are activated may change. For example, considering switching 48 signals through 96 feeds, 48 feeds would be selected without pairing. In coverage map 800A, 53 total feeds were energized, as described previously. However, coverage map 800B includes 6 pairings. Accordingly, 48−6+6*2=54 total feeds are energized, with 48−6=42 feeds being unpaired and 6*2=12 feeds being paired.

Figure 9:
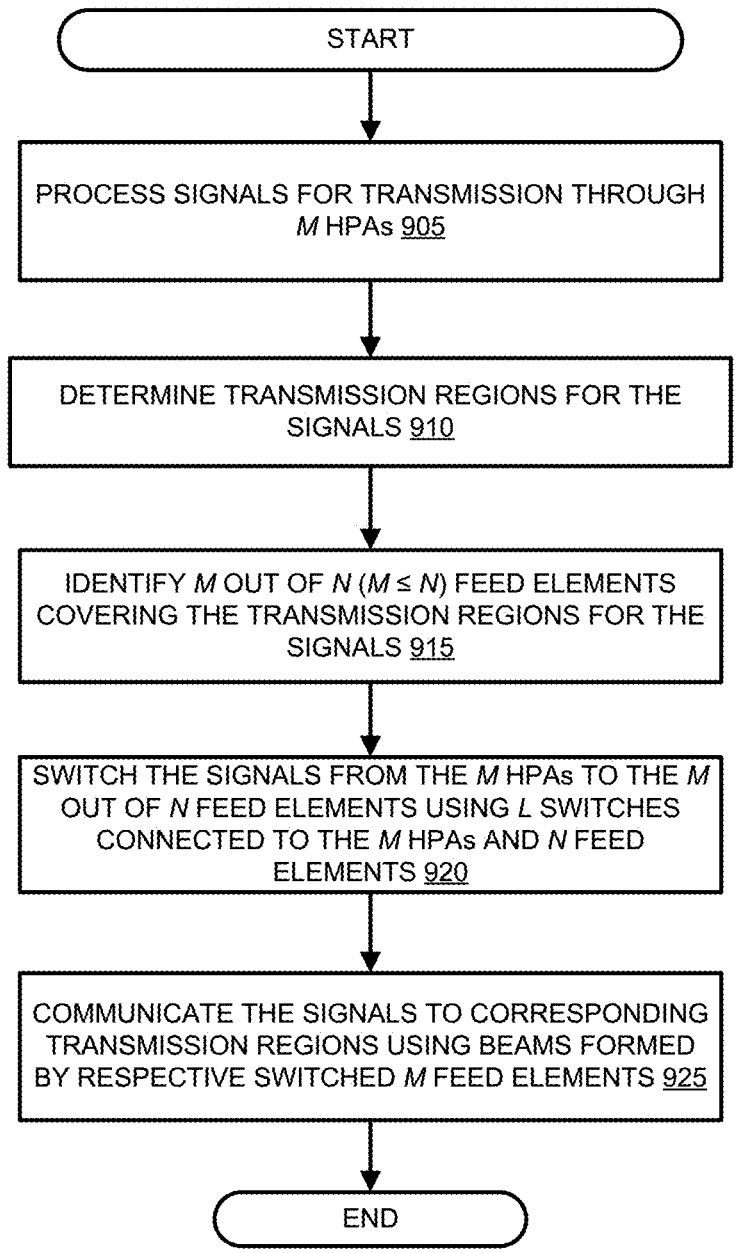
FIG. 9 illustrates an example process for flexible beamforming by switching signals through a subset of feeds in a satellite output section.

FIG. 9 illustrates an example process 900 for flexible beamforming by switching signals through a subset of feeds in a satellite output section. The process 900 may be performed by a beam former processor in a satellite output section, e.g., beam former processor 202 as described with respect to configuration 200B. Accordingly, the following section describes the process 900 with respect to the satellite output section 200B. However, the process 900 also may be performed by other satellite configurations, and/or by other satellite components.

In some implementations, the beam former processor executes one or more instructions to perform the process 900. These instructions may be stored in memory, e.g., flash memory, hard disk or some other suitable memory, which is coupled to the beam former processor. Alternatively, the instructions may be sent to the beam former processor from the ground, e.g., through satellite gateway 110 or 125.

At 905, signals are processed for transmission through M HPAs (M being an integer). For example, the beam former processor 202 may process 48 active signal streams (i.e., M=48) for transmission through 48 HPAs in the satellite output section 200B, including HPAs 204a-204d and 208a-208d.

The transmission regions for the signals are determined at 910. For example, the beam former processor 202 may determine which HPA signals are to be beamed to which terrestrial regions such that adequate signal coverage (i.e., signal power above a certain threshold) is provided in all areas where coverage is desired.

At 915, M out of N (M≤N, M and N being integers) feed elements covering the transmission regions for the signals are identified. For example, the beam former processor 202 may determine which feeds in the satellite output section should be energized by switching the amplified HPA output signals to these selected feeds, so that each HPA signal is transmitted to the terrestrial region identified corresponding to the signal. As noted previously, in some implementations, the N available feeds may be greater than the M active feeds processed by the processor. For example, N=96 while M=48. Accordingly, the processor may select 48 out of the available 96 feeds for beamforming.

At 920, the signals from the M HPAs are switched to the M out of N feed elements using L switches (L being an integer) connected to the M HPAs and N feed elements. For example, the beam former processor 202 determines the subset of the feeds that are to be energized and a mapping of the HPA output signals to these feeds. The beam former processor then determines, for each ring of HPA signals and corresponding feed mapping, how the switches in the switching matrix associated with the ring are to be controlled to send the HPA signals to the corresponding mapped feeds. The beam former processor then controls the switches to switch the HPA output signals to the corresponding mapped feeds. For example, the beam former processor 202 may determine to send the signal output by HPA 204*a* to feed 214*a*. Based on mapping HPA 204*a* signal to feed 214*a*, the processor 202 determines that the signal from HPA 204*a* can be sent to feed 214*a* by routing through switch 206*a* in switching matrix 206 that is connected to the ring of HPAs 204*a*-204*d*. Accordingly, the processor 202 controls the switching matrix 206 to route the signal output by HPA 204*a* to feed 214*a* through switch 206*a*.

In some implementations, the number of switches L may be same as the number of feeds N. For example, in the configuration 200B, 96 "R" switches may be used to connect 48 HPAs to 96 feeds. However, in some other implementations, the number of switches L may be different from the number of feeds N. This may be the case, for example, when switches other than "R" switches are used, which may be capable of routing multiple HPA input signals to multiple feed elements.

At 925, the signals are communicated to corresponding transmission regions using beams formed by respective switched M feed elements. For example, the M selected feeds are energized by the active signal streams that are routed, from the M HPA outputs and through the L switches, to these feed elements. The M energized feeds form beams covering their corresponding terrestrial regions based on the beam coefficients received in the signal streams.

Figure 10:
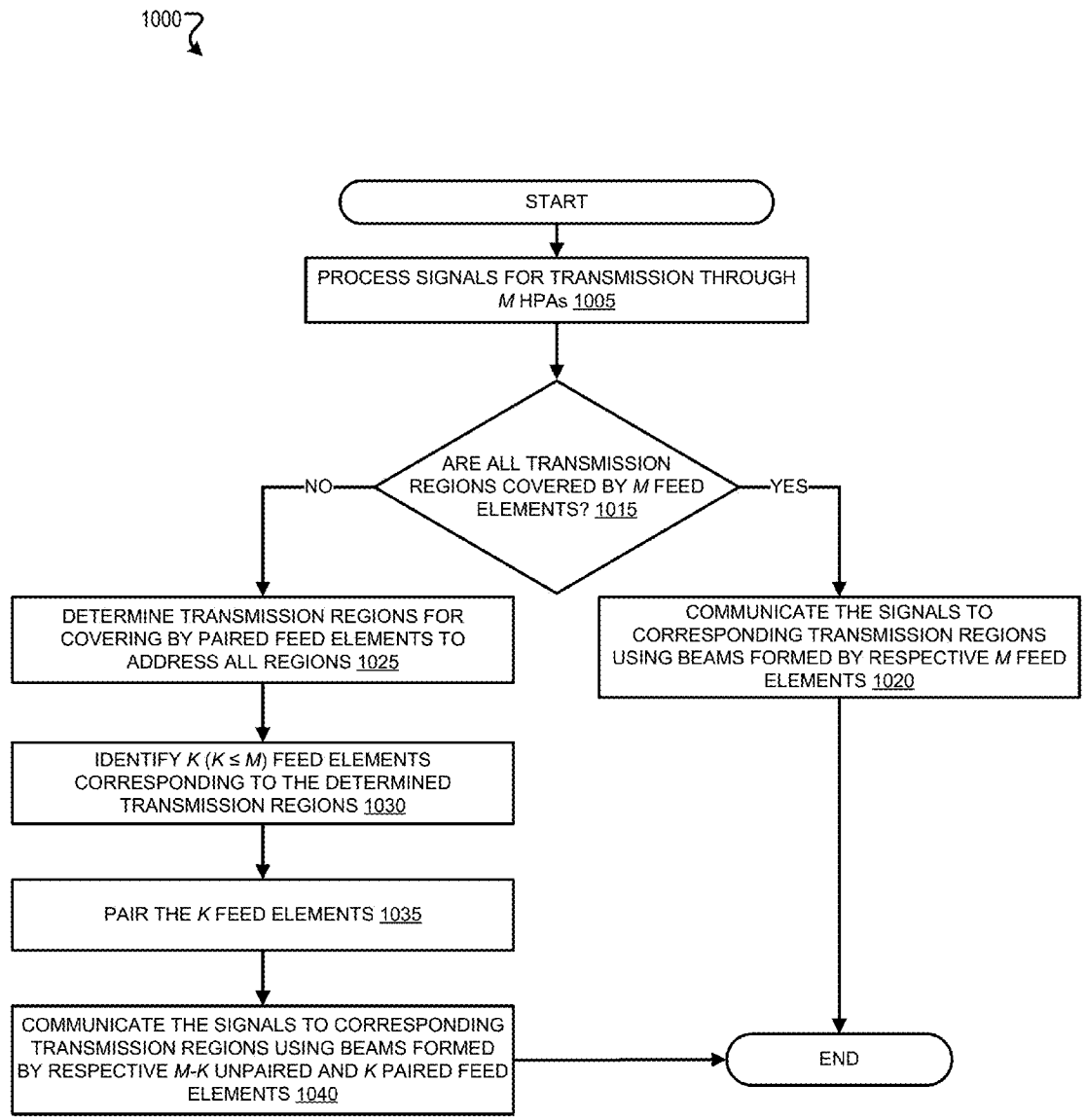
FIG. 10 illustrates an example process for flexible beamforming by using paired feeds in a satellite output section.

FIG. 10 illustrates an example process 1000 for flexible beamforming by using paired feeds in a satellite output section. The process 1000 may be performed by a beam former processor in a satellite output section, e.g., beam former processor 202 as described with respect to configuration 200B. Accordingly, the following section describes the process 900 with respect to the satellite output section 200B. However, the process 1000 also may be performed by other satellite configurations, and/or by other satellite components.

In some implementations, the beam former processor executes one or more instructions to perform the process 1000. These instructions may be stored in memory, e.g., flash memory, hard disk or some other suitable memory, which is coupled to the beam former processor. Alternatively, the instructions may be sent to the beam former processor from the ground, e.g., through satellite gateway 110 or 125.

At 1005, signals are processed for transmission through M HPAs (M being an integer). For example, the beam former processor 202 may process 48 active signal streams (i.e., M=48) for transmission through 48 HPAs in the satellite output section 200B, including HPAs 204*a*-204*d* and 208*a*-208*d*.

At 1015, it is determined whether all transmission regions for the signals are covered by M feed elements. For example, in some configurations, the mapping of M HPA outputs to N feeds may be preconfigured. As noted previously, this may be the case when a switching circuitry is not present in the satellite output signal. Each HPA output may be directly coupled to one or more feeds through hybrid pairing matrices. For example, HPA 204*a* may be directly coupled to feeds 214*a* and 214*b* through hybrid matrix 212*a*. In such cases, the beam former processor 202 may determine, for each HPA connection that is coupled to one or more known feeds through a hybrid matrix, which of these one or more known feeds should be receiving the HPA signal (e.g., either feed 214*a* or feed 214*b* that may receive HPA 204*a* signal through hybrid matrix 212*a*). In this manner, for M HPA signals, a subset of M individual feeds (out of the total N feeds) may be determined. Subsequently, the beam former processor 202 can determine whether these M unpaired feeds can provide coverage such that all targeted terrestrial regions are covered.

If it is determined that all terrestrial regions are covered by M feed elements, then at 1020 the signals are communicated to corresponding transmission regions using beams formed by respective M feed elements. For example, the beam former processor 202 may control the hybrid matrix 212*a* to send the HPA 204*a* signal through unpaired feed 214*a*; and/or control the hybrid matrix 212*b* to send the HPA 204*b* signal through unpaired feed 214*c*, among others.

On the other hand, if it is determined that all terrestrial regions cannot be covered by M feed elements, then at 1025 one or more transmission regions for covering by paired feed elements are determined to address all regions. For example, the beam former processor may determine that the selected feeds does not provide adequate coverage in region 828*a*, shown in coverage maps 800A and 800B.

At 1030, K (K≤M) (K being an integer) feed elements corresponding to the determined transmission regions are identified. For example, the beam former processor may determine that a feed covering region 828*b* may paired with an adjacent feed, such that the HPA signal associated with the feed covering region 828*b* may be shared with the paired feed to also cover region 828*a*. Considering the configuration 200B, feed 214*a* may be transmitting HPA signal 204*a* to region 828*b*. In this case, the beam former processor 202 may determine that by pairing feed 214*a* with feed 214*b* in the hybrid matrix 212*a*, the HPA signal 204*a* may be shared between the feeds, enabling feed 214*b* to form a beam that covers region 828*b*. In a similar manner, feeds for pairing in other regions, e.g., 822-826 or 830, also may be determined.

As noted, a subset K of the M feeds may be identified for pairing. For example, in the coverage maps 800A and 800B, 5 and 6 feeds respectively out of 48 feeds that are transmitting 48 HPA signals are identified for pairing. However, in some other implementations, all M feeds may be identified for pairing, i.e., K=M For example, in coverage map 700C, all 96 feeds are paired.

At 1035, the K feed elements are paired. For example, the beam former processor 202 may control the hybrid matrix 212*a* to pair the feeds 214*a* and 214*b*.

At 1040, the signals are communicated to corresponding transmission regions using beams formed by respective M-K unpaired and K paired feed elements. For example, the signal processor 202 generates the coverage map 800A by transmitting 48 HPA signals through the feeds covering the landmasses in the western hemisphere. As described previously, 43 signals are transmitted using 43 unpaired feeds, while 5 signals are transmitted using 5 feed pairings, indicated by 822-830.

Figure 11:
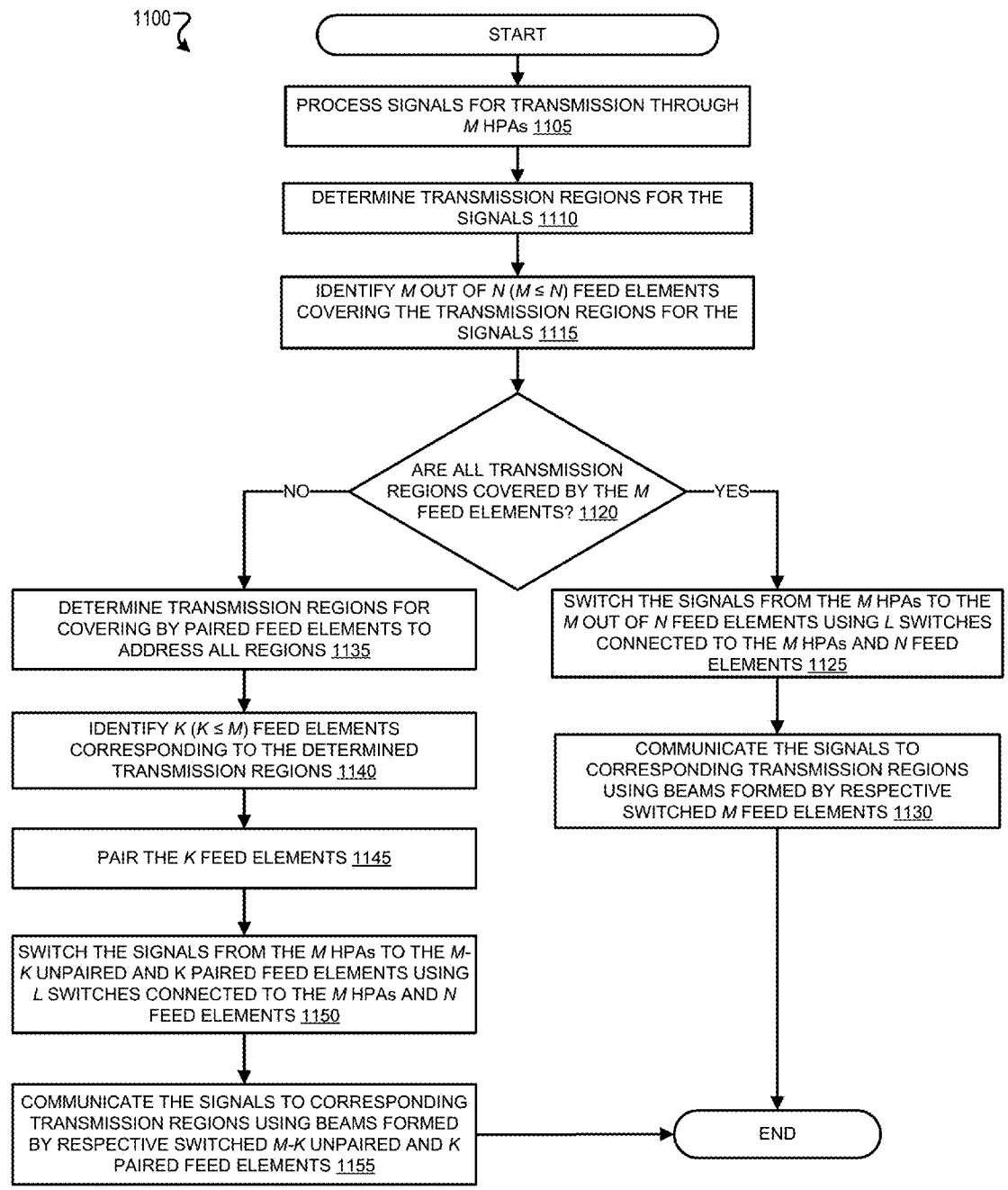
FIG. 11 illustrates an example process for flexible beamforming by a combination of switching and feed pairing with a subset of feeds in a satellite output section.

FIG. 11 illustrates an example process 1100 for flexible beamforming by a combination of switching and feed pairing with a subset of feeds in a satellite output section. The process 1100 may be performed by a beam former processor in a satellite output section, e.g., beam former processor 202 as described with respect to configuration 200B. Accordingly, the following section describes the process 1100 with respect to the satellite output section 200B. However, the process 1100 also may be performed by other satellite configurations, and/or by other satellite components.

In some implementations, the beam former processor executes one or more instructions to perform the process 1100. These instructions may be stored in memory, e.g., flash memory, hard disk or some other suitable memory, which is coupled to the beam former processor. Alternatively, the instructions may be sent to the beam former processor from the ground, e.g., through satellite gateway 110 or 125.

At 1105, signals are processed for transmission through M HPAs (M being an integer). For example, the beam former processor 202 may process 48 active signal streams (i.e., M=48) for transmission through 48 HPAs in the satellite output section 200B, including HPAs 204a-204d and 208a-208d.

The transmission regions for the signals are determined at 1110. For example, the beam former processor 202 may determine which HPA signals are to be beamed to which terrestrial regions such that adequate signal coverage (i.e., signal power above a certain threshold) is provided in all areas where coverage is desired.

At 1115, M out of N (M≤N, M and N being integers) feed elements covering the transmission regions for the signals are identified. For example, the beam former processor 202 may determine which feeds in the satellite output section should be energized by switching the amplified signals output by the HPAs to these selected feeds, so that each HPA signal is transmitted to the terrestrial region identified corresponding to the signal. As noted previously, in some implementations, the N available feeds may be greater than the M active feeds processed by the processor. For example, N=96 while M=48. Accordingly, the processor may select 48 out of the available 96 feeds for beamforming.

At 1120, it is determined whether all transmission regions for the signals are covered by the M selected feed elements. For example, the beam former processor 202 may determine whether M unpaired feeds that are selected for receive signals from M HPAs (e.g., can provide coverage such that all targeted terrestrial regions are covered.

If it is determined that all terrestrial regions are covered by M feed elements, then at 1125 the signals from the M HPAs are switched to the selected M out of N feed elements using L switches (L being an integer) connected to the M HPAs and N feed elements. For example, the beam former processor 202 determines the subset of the unpaired feeds that are to be energized and a mapping of the HPA output signals to these feeds. The beam former processor then determines, for each ring of HPA signals and corresponding feed mapping, how the switches in the switching matrix associated with the ring are to be controlled to send the HPA signals to the corresponding mapped feeds. The beam former processor then controls the switches to route the HPA output signals to hybrid matrices corresponding to the mapped feeds. For example, the beam former processor 202 may determine to send the signal output by HPA 204a to feed 214c. Based on mapping HPA 204a signal to feed 214c, the processor 202 determines that the signal from HPA 204a can be sent to feed 214c by routing the signal to hybrid matrix 212b through switches 206 and 206b in switching matrix 206 that is connected to the ring of HPAs 204a-204d. Accordingly, the processor 202 controls the switching matrix 206 to route the signal output by HPA 204a to hybrid matrix 212b feed 214c through switches 206a and 206b. The processor 202 then controls the hybrid matrix 212b such that the HPA 204a signal received at an input port of the hybrid matrix 212b is forwarded to feed 214c connected to an output port of the hybrid matrix 212b, without forwarding the signal to feed 214d that is connected to another output port of the hybrid matrix 212b.

As described previously, in some implementations, the number of switches L may be same as the number of feeds N. For example, in the configuration 200B, 96 "R" switches may be used to connect 48 HPAs to 96 feeds. However, in some other implementations, the number of switches L may be different from the number of feeds N. This may be the case, for example, when switches other than "R" switches are used, which may be capable of routing multiple HPA input signals to multiple feed elements.

At 1130, the signals are communicated to corresponding transmission regions using beams formed by respective switched M feed elements, which are unpaired. For example, the M selected feeds are energized by the active signal streams that are routed, from the M HPA outputs and through the L switches and the hybrid matrices to which these feeds are coupled, to these feed elements. The M energized feeds form beams without pairing covering their corresponding terrestrial regions based on the beam coefficients received in the signal streams.

On the other hand, if at 1120 it is determined that all terrestrial regions cannot be covered by the M selected feed elements, then at 1135 one or more transmission regions for covering by paired feed elements are determined to address all regions. For example, the beam former processor may determine that the selected feeds does not provide adequate coverage in region 828a, shown in coverage maps 800A and 800B.

At 1140, K (K≤M) (K being an integer) feed elements corresponding to the determined transmission regions are identified. For example, the beam former processor may determine that a feed covering region 828b may paired with an adjacent feed, such that the HPA signal associated with the feed covering region 828b may be shared with the paired feed to also cover region 828a. Considering the configuration 200B, feed 214a may be transmitting HPA signal 204a to region 828b. In this case, the beam former processor 202 may determine that by pairing feed 214a with feed 214b in the hybrid matrix 212a, the HPA signal 204a may be shared between the feeds, enabling feed 214b to form a beam that covers region 828b. In a similar manner, feeds for pairing in other regions, e.g., 822-826 or 830, also may be determined.

As discussed previously, in some implementations, a subset K of the M feeds may be identified for pairing. For example, in the coverage maps 800A and 800B, 5 and 6 feeds respectively out of 48 feeds that are transmitting 48 HPA signals are identified for pairing. However, in some other implementations, all M feeds may be identified for pairing, i.e., K=M. For example, in coverage map 700C, all 96 feeds are paired.

At 1145, the K feed elements are paired. For example, the beam former processor 202 may control the hybrid matrix 212a to pair the feed 214a with feed 214b.

At 1150, the signals from the M HPAs are switched to the M-K unpaired and K paired feed elements using L switches (L being an integer) connected to the M HPAs and N feed elements. For example, the beam former processor 202 controls the switches in the switching matrices connected to the HPA rings to route the HPA output signals to the hybrid matrices to which the selected feeds are coupled.

For a feed that is unpaired, the beam former processor controls the associated hybrid matrix to forward the HPA signal received at an input port of the hybrid matrix to the selected feed that is connected to an output port of the hybrid matrix, without forwarding the signal to any other feed connected to other output port(s) of the hybrid matrix. For example, in one implementation the beam former processor 202 may map the HPA 208a signal to feed 214d. Accordingly, the beam former processor 202 controls the switching matrix 210 to route the HPA 208a signal through switches 210a and 210b to hybrid matrix 212b. The beam former processor 202 further controls the hybrid matrix 212b to route the HPA 208a signal received at an input port of 212b to feed 214d connected to an output port of 212b, without sending the HPA 208a signal to feed 214c connected at the other output port of 212b.

For a feed that is paired, the beam former processor controls the associated hybrid matrix to forward the HPA signal received at an input port of the hybrid matrix to the selected feed, and also to one or more other feeds in the hybrid matrix that are paired with the selected feed. For example, in one implementation the beam former processor 202 may map the HPA 204a signal to paired feeds 214a and 214b. Accordingly, the beam former processor 202 controls the switching matrix 206 to route the HPA 204a signal through switch 206a to hybrid matrix 212a. The beam former processor 202 further controls the hybrid matrix 212a to route the HPA 204a signal received at an input port of 212a to both feeds 214a and 214b that are connected to the output ports of 212a.

As described above, in some implementations, the number of switches L may be same as the number of feeds N. For example, in the configuration 200B, 96 "R" switches may be used to connect 48 HPAs to 96 feeds. However, in some other implementations, the number of switches L may be different from the number of feeds N. This may be the case, for example, when switches other than "R" switches are used, which may be capable of routing multiple HPA input signals to multiple feed elements.

At 1155, the signals are communicated to corresponding transmission regions using beams formed by respective M-K unpaired and K paired feed elements. For example, the signal processor 202 generates the coverage map 800A by transmitting 48 HPA signals through a subset of 96 feeds that cover the landmasses in the western hemisphere. As described previously, in this case M=48 and K=5. 43 signals are transmitted using 48−5=43 unpaired feeds, while 5 signals are transmitted using 5 feed pairings, indicated by 822-830.

The disclosed and other examples can be implemented as one or more computer program products, i.e., one or more modules of computer program instructions encoded on a computer readable medium for execution by, or to control the operation of, data processing apparatus. The implementations can include single or distributed processing of algorithms. The computer readable medium can be a machine-readable storage device, a machine-readable storage substrate, a memory device, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A system may encompass all apparatus, devices, and machines for processing data, including by way of example a programmable processor, a computer, or multiple processors or computers. A system can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed for execution on one computer or on multiple computers that are located at one site or distributed across multiple sites and interconnected by a communications network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer can include a processor for performing instructions and one or more memory devices for storing instructions and data. Generally, a computer can also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data can include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this document may describe many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination in some cases can be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. An apparatus comprising:
a plurality of amplifiers configured to output amplified signals;
an array of feeds configured to form beams based on the amplified signals, wherein a total number of feeds in the array is greater than a total number of amplifiers in the plurality of amplifiers;
a switching circuitry configured to route the amplified signals to a subset of feeds in the array; and
a beam former processor configured to perform operations comprising:
receiving, at a first time, a first group of signals for transmission through the plurality of amplifiers, wherein the first group of signals is less than a total number of feeds in the array;
determining first terrestrial regions for transmitting the first group of signals;
identifying a first subset of feeds that are configured to form beams covering the first terrestrial regions; and
controlling the switching circuitry to route the first group of signals from the plurality of amplifiers to the first subset of feeds through the switching circuitry, such that the first subset of feeds are enabled to form beams that cover the first terrestrial regions based on the first group of signals.

2. The apparatus of claim 1, wherein identifying the first subset of feeds comprises:
identifying feeds equal in number to the first group of signals such that the beams formed by the identified feeds are configured to cover the first terrestrial regions with signal level above a predetermined threshold.

3. The apparatus of claim 2, wherein the signal level includes at least one of signal power or signal gain.

4. The apparatus of claim 1, wherein controlling the switching circuitry to route the first group of signals comprises:
selecting, in the switching circuitry, a first group of switches that are configured to connect the plurality of amplifiers to the first subset of feeds; and
activating the first group of switches such that the first group of signals are routed from the plurality of amplifiers to the first subset of feeds through the first group of switches without routing the signals to other feeds outside the first subset of feeds.

5. The apparatus of claim 4, wherein a total number of switches in the switching circuitry equals the total number of feeds in the array, and wherein routing the first group of signals through the first group of switches comprises:
for each signal, determining one or more switches that forms a forwarding path from an amplifier outputting the signal to a feed element identified for beamforming using the signal, wherein the determining is performed such that switches forming forwarding paths for every signal in the first group of signals are determined.

6. The apparatus of claim 4, wherein the plurality of amplifiers are grouped into rings of amplifiers, each ring associated with a known subset of amplifiers in the plurality of amplifiers and a known subset of switches in the switching circuitry.

7. The apparatus of claim 6, wherein the known subset of switches associated with a ring are configured to route signals output by the known subset of amplifiers associated with the ring to a known subset of feeds.

8. The apparatus of claim 6, wherein the known subset of switches are preconfigured to receive signals from amplifiers associated with one or more known rings.

9. The apparatus of claim 1, wherein the beam former processor is configured to perform operations further comprising:
receiving, at a second time, a second group of signals for transmission through the plurality of amplifiers, wherein the second group of signals is less than a total number of feeds in the array;
determining second terrestrial regions for transmitting the second group of signals;
identifying a second subset of the feeds that are configured to form beams covering the second terrestrial regions; and
controlling the switching circuitry to route the second group of signals from the plurality of amplifiers to the second subset of the feeds through the switching circuitry such that the second subset of the feeds are enabled to form beams that cover the second terrestrial regions based on the second group of signals.

10. The apparatus of claim 9, wherein the second group of signals are distinct from the first group of signals, the second terrestrial regions are distinct from the first terrestrial regions and the second subset of the feeds are distinct from the first subset of feeds and the configuration of the switching circuitry to route the second group of signals is different from the configuration of the switching circuitry to route the first group of signals.

11. The apparatus of claim 1, wherein the apparatus includes a beamforming satellite.

12. An apparatus comprising:
a plurality of amplifiers configured to output amplified signals;
an array of feeds configured to form beams based on the amplified signals;
a plurality of hybrid matrices, each hybrid matrix configured to perform operations comprising:
receiving one or more amplified signals at input ports from one or more amplifiers;
forwarding a received signal to an individual feed coupled to an output port of the hybrid matrix in a first configuration of matrix circuitry; and
forwarding a received signal to a group of feeds coupled to output ports of the hybrid matrix in a second configuration of the matrix circuitry; and
a beam former processor configured to perform operations comprising:
receiving, at a first time, a first group of signals for transmission through the plurality of amplifiers;
determining first terrestrial regions for transmitting the first group of signals;
identifying a first subset of feeds that are configured to form beams covering the first terrestrial regions;
determining whether all first terrestrial regions are covered by beams formed using the first subset of feeds;
based on determining that all first terrestrial regions are not covered by beams formed using the first subset of feeds, determining a subset of the first terrestrial regions for covering by grouping feeds;

identifying, from the first subset of feeds, a second subset of feeds that are configured to form beams covering the subset of the first terrestrial regions;

controlling hybrid matrices coupled to the second subset of feeds to group, in each hybrid matrix using the second configuration of the matrix circuitry, feeds that are coupled to the hybrid matrix and forwarding a respective received signal to the grouped feeds; and controlling hybrid matrices coupled to remaining feeds in the first subset of feeds to forward, in each hybrid matrix using the first configuration of the matrix circuitry, a respective received signal to an individual feed coupled to the hybrid matrix that is one of the remaining feeds in the first subset of feeds, wherein the second subset of feeds and the remaining feeds in the first subset of feeds are enabled to form beams that cover the first terrestrial regions based on receiving the first group of signals from respective hybrid matrices.

13. The apparatus of claim 12, wherein each amplifier is coupled to an input port of a single hybrid matrix, and wherein identifying the first subset of feeds comprises:

for each amplifier, identifying feeds that are coupled to output ports of the hybrid matrix associated with the amplifier, and selecting one of the identified feeds for receiving the signal output by the amplifier.

14. The apparatus of claim 13, wherein determining whether all first terrestrial regions are covered by beams formed using the first subset of feeds comprises:

determining whether the beams formed using the first subset of feeds can transmit the signals to the first terrestrial regions with signal level above a predetermined threshold.

15. The apparatus of claim 14, wherein the signal level includes at least one of signal power or signal gain.

16. The apparatus of claim 14, wherein determining the subset of the first terrestrial regions for covering by grouping feeds comprises:

determining one or more of the first terrestrial regions that are lower in priority than remaining first terrestrial regions, such that signals can be transmitted to the one or more of the first terrestrial regions that are lower in priority with lower signal level compared to signals that are transmitted to remainder of the first terrestrial regions, wherein the lower signal level is above the predetermined threshold.

17. The apparatus of claim 12, wherein the beam former processor is configured to perform operations further comprising:

receiving, at a second time, a second group of signals for transmission through the plurality of amplifiers;

determining second terrestrial regions for transmitting the second group of signals;

identifying a third subset of feeds that are configured to form beams covering the second terrestrial regions;

determining whether all second terrestrial regions are covered by beams formed using the third subset of feeds;

based on determining that all second terrestrial regions are not covered by beams formed using the third subset of feeds, determining a subset of the second terrestrial regions for covering by grouping feeds;

identifying, from the third subset of feeds, a fourth subset of feeds that are configured to form beams covering the subset of the second terrestrial regions;

controlling hybrid matrices coupled to the fourth subset of feeds to group, in each hybrid matrix using the second configuration of the matrix circuitry, feeds that are coupled to the hybrid matrix and forwarding a respective received signal to the grouped feeds; and controlling hybrid matrices coupled to remaining feeds in the second subset of feeds to forward, in each hybrid matrix using the first configuration of the matrix circuitry, a respective received signal to an individual feed coupled to the hybrid matrix that is one of the remaining feeds in the second subset of feeds, wherein the third subset of feeds and the remaining feeds in the second subset of feeds are enabled to form beams that cover the second terrestrial regions based on the second group of signals.

18. The apparatus of claim 17, wherein the second group of signals are distinct from the first group of signals, the second terrestrial regions are distinct from the first terrestrial regions, the third subset of feeds are distinct from the first subset of feeds and the fourth subset of feeds are distinct from the second subset of feeds.

19. The apparatus of claim 12, wherein the apparatus includes a beamforming satellite.

20. An apparatus comprising:

a plurality of amplifiers configured to output amplified signals;

an array of feeds configured to form beams based on the amplified signals, wherein a total number of feeds in the array is greater than a total number of amplifiers in the plurality of amplifiers;

a switching circuitry configured to route the amplified signals to a subset of feeds in the array;

a plurality of hybrid matrices, each hybrid matrix configured to perform operations comprising:

receiving one or more amplified signals at input ports from one or more amplifiers through the switching circuitry;

forwarding a received signal to an individual feed coupled to an output port of the hybrid matrix in a first configuration of matrix circuitry; and forwarding a received signal to a group of feeds coupled to output ports of the hybrid matrix in a second configuration of the matrix circuitry; and a beam former processor configured to perform operations comprising:

receiving, at a first time, a first group of signals for transmission through the plurality of amplifiers, wherein the first group of signals is less than a total number of feeds in the array;

determining first terrestrial regions for transmitting the first group of signals;

identifying a first subset of feeds that are configured to form beams covering the first terrestrial regions;

determining whether all first terrestrial regions are covered by beams formed using the first subset of feeds;

based on determining that all first terrestrial regions are not covered by beams formed using the first subset of feeds, determining a subset of the first terrestrial regions for covering by grouping feeds;

identifying, from the first subset of feeds, a second subset of feeds that are configured to form beams covering the subset of the first terrestrial regions;

controlling the switching circuitry to route the first group of signals from the plurality of amplifiers to a first group of hybrid matrices coupled to the first subset of feeds through the switching circuitry;

controlling a subset of the first group of hybrid matrices that are coupled to the second subset of feeds to group, in each hybrid matrix using the second configuration of the matrix circuitry, feeds that are coupled to the hybrid matrix and forwarding a respective received signal to the grouped feeds; and controlling a remainder of the first group of hybrid matrices that are coupled to remaining feeds in the first subset of feeds to forward, in each hybrid matrix using the first configuration of the matrix circuitry, a respective received signal to an individual feed coupled to the hybrid matrix that is one of the remaining feeds in the first subset of feeds, wherein the second subset of feeds and the remaining feeds in the first subset of feeds are enabled to form beams that cover the first terrestrial regions based on receiving the first group of signals from respective hybrid matrices.

21. The apparatus of claim 20, wherein identifying the first subset of feeds comprises:
identifying feeds equal in number to the first group of signals such that the beams formed by the identified feeds are configured to cover the first terrestrial regions with signal level above a predetermined threshold.

22. The apparatus of claim 21, wherein the signal level includes at least one of signal power or signal gain.

23. The apparatus of claim 20, wherein controlling the switching circuitry to route the first group of signals comprises:
selecting, in the switching circuitry, a first group of switches that are configured to connect the plurality of amplifiers to the first group of hybrid matrices; and
activating the first group of switches such that the first group of signals are routed from the plurality of amplifiers to the first group of hybrid matrices through the first group of switches without routing the signals to other hybrid matrices outside the first group of hybrid matrices.

24. The apparatus of claim 23, wherein a total number of switches in the switching circuitry equals the total number of feeds in the array, and wherein routing the first group of signals using the first group of switches comprises:
for each signal, determining one or more switches that forms a forwarding path from an amplifier outputting the signal to a hybrid matrix coupled to a feed element identified for beamforming using the signal, wherein the determining is performed such that switches forming forwarding paths for every signal in the first group of signals are determined.

25. The apparatus of claim 23, wherein the plurality of amplifiers are grouped into rings of amplifiers, each ring associated with a known subset of amplifiers in the plurality of amplifiers and a known subset of switches in the switching circuitry.

26. The apparatus of claim 25, wherein the known subset of switches associated with a ring are configured to route signals output by the known subset of amplifiers associated with the ring to a known subset of hybrid matrices coupled to a known subset of feeds.

27. The apparatus of claim 26, wherein the known subset of hybrid matrices are preconfigured to receive signals from amplifiers associated with one or more known rings.

28. The apparatus of claim 20, wherein each amplifier is coupled to an input port of one or more hybrid matrices, and wherein identifying the first subset of feeds comprises:
for each amplifier, identifying a feed for receiving the signal output by the amplifier, and determining a hybrid matrix that is coupled to the identified feed.

29. The apparatus of claim 20, wherein determining whether all first terrestrial regions are covered by beams formed using the first subset of feeds comprises:
determining whether the beams formed using the first subset of feeds can transmit the signals to the first terrestrial regions with signal level above a predetermined threshold.

30. The apparatus of claim 29, wherein the signal level includes at least one of signal power or signal gain.

31. The apparatus of claim 30, wherein determining the subset of the first terrestrial regions for covering by grouping feeds comprises:
determining one or more of the first terrestrial regions that are lower in priority than remaining first terrestrial regions, such that signals can be transmitted to the one or more of the first terrestrial regions that are lower in priority with lower signal level compared to signals that are transmitted to remainder of the first terrestrial regions,
wherein the lower signal level is above the predetermined threshold.

32. The apparatus of claim 20, wherein the beam former processor is configured to perform operations further comprising:
receiving, at a second time, a second group of signals for transmission through the plurality of amplifiers, wherein the second group of signals is less than a total number of feeds in the array;
determining second terrestrial regions for transmitting the second group of signals;
identifying a third subset of feeds that are configured to form beams covering the second terrestrial regions;
determining whether all second terrestrial regions are covered by beams formed using the third subset of feeds;
based on determining that all second terrestrial regions are not covered by beams formed using the third subset of feeds, determining a subset of the second terrestrial regions for covering by grouping feeds;
identifying, from the third subset of feeds, a fourth subset of feeds that are configured to form beams covering the subset of the second terrestrial regions;
controlling the switching circuitry to route the second group of signals from the plurality of amplifiers to a second group of hybrid matrices coupled to the third subset of feeds through the switching circuitry;
controlling a subset of the second group of hybrid matrices that are coupled to the fourth subset of feeds to group, in each hybrid matrix using the second configuration of the matrix circuitry, feeds that are coupled to the hybrid matrix and forwarding a respective received signal to the grouped feeds; and
controlling a remainder of the second group of hybrid matrices that are coupled to remaining feeds in the third subset of feeds to forward, in each hybrid matrix using the first configuration of the matrix circuitry, a respective received signal to an individual feed coupled to the hybrid matrix that is one of the remaining feeds in the third subset of feeds,
wherein the fourth subset of feeds and the remaining feeds in the third subset of feeds are enabled to form beams that cover the second terrestrial regions based on receiving the second group of signals from respective hybrid matrices.

33. The apparatus of claim 32, wherein the second group of signals are distinct from the first group of signals, the second terrestrial regions are distinct from the first terrestrial regions, the third subset of feeds are distinct from the first subset of feeds and the fourth subset of feeds are distinct from the second subset of feeds, the second group of hybrid matrices are distinct from the first group of hybrid matrices, and the configuration of the switching circuitry to route the second group of signals is different from the configuration of the switching circuitry to route the first group of signals.

34. The apparatus of claim 20, wherein the apparatus includes a beamforming satellite.

* * * * *